(12) United States Patent
Stapf et al.

(10) Patent No.: US 12,454,635 B2
(45) Date of Patent: Oct. 28, 2025

(54) TWO COMPONENT (2K) CURABLE ADHESIVE COMPOSITION

(71) Applicant: Henkel AG & Co. KGaA, Duesseldorf (DE)

(72) Inventors: Stefanie Stapf, Essen (DE); Thomas Moeller, Duesseldorf (DE); Alexandra Lieske, Duesseldorf (DE); Jordan Gutierrez Diaz, Duesseldorf (DE); Chloe Grevey, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 231 days.

(21) Appl. No.: 17/838,724

(22) Filed: Jun. 13, 2022

(65) Prior Publication Data

US 2022/0315813 A1    Oct. 6, 2022

Related U.S. Application Data

(63) Continuation of application No. PCT/EP2020/083134, filed on Nov. 24, 2020.

(30) Foreign Application Priority Data

Dec. 13, 2019   (EP) ..................... 19216094

(51) Int. Cl.
*C09J 163/00*        (2006.01)
*C09J 133/10*        (2006.01)

(52) U.S. Cl.
CPC ........... *C09J 163/00* (2013.01); *C09J 133/10* (2013.01); *C09J 2301/408* (2020.08); *C09J 2301/502* (2020.08)

(58) Field of Classification Search
CPC ...... C09J 163/00; C09J 9/02; C09J 2203/326; C09J 2301/314; C09J 2301/408;
(Continued)

(56) References Cited

U.S. PATENT DOCUMENTS

| 385,504 A | 7/1888 | Colwell |
| 4,171,240 A | 10/1979 | Wong |

(Continued)

FOREIGN PATENT DOCUMENTS

| DE | 102005050632 | 5/2007 |
| DE | 102014103923 | 10/2014 |

(Continued)

OTHER PUBLICATIONS

PCT International Search Report—International Patent Application No. PCT/EP2020/083134—Mailing date: Feb. 5, 2021.
(Continued)

*Primary Examiner* — George R Koch
*Assistant Examiner* — Christopher C Caillouet
(74) *Attorney, Agent, or Firm* — Steven C. Bauman

(57) ABSTRACT

The present invention is directed to a curable and debondable two-part (2K) hybrid adhesive composition comprising: i) a first part comprising: a) epoxy resin; b) (meth)acrylate monomer; c) an electrolyte; d) a solubilizer; and e) a filler; and, ii) a second part comprising: a) a curing agent consisting of at least one compound possessing at least two epoxide reactive groups per molecule; b) an accelerator; and, c) a filler.

15 Claims, 4 Drawing Sheets

(58) Field of Classification Search
CPC .. C09J 2301/502; C08K 3/013; C08K 5/0025; C08K 2201/001; C08K 3/34; C08K 3/36; C08K 5/3445; C08K 5/5415; C08G 59/5006; C08L 71/02
See application file for complete search history.

(56) References Cited

U.S. PATENT DOCUMENTS

| | | | |
|---|---|---|---|
| 4,729,797 | A | 3/1988 | Linde et al. |
| 4,731,146 | A | 3/1988 | Clark |
| 4,990,281 | A | 2/1991 | Clark |
| 5,811,473 | A | 9/1998 | Ramos et al. |
| 6,111,015 | A | 8/2000 | Eldin et al. |
| 6,620,308 | B2 | 9/2003 | Gilbert |
| 6,852,193 | B2 | 2/2005 | Coughlan et al. |
| 7,332,218 | B1 | 2/2008 | Gilbert |
| 7,465,492 | B2 | 12/2008 | Gilbert |
| 2005/0090626 | A1 | 4/2005 | Liu et al. |
| 2007/0269659 | A1 | 11/2007 | Gilbert |
| 2008/0196828 | A1 | 8/2008 | Gilbert |
| 2008/0283415 | A1 | 11/2008 | Gilbert |
| 2010/0000878 | A1 | 1/2010 | Gilbert |
| 2018/0142116 | A1* | 5/2018 | Lee .................. C09D 5/00 |

FOREIGN PATENT DOCUMENTS

| | | |
|---|---|---|
| EP | 1200252 | 9/2006 |
| GB | 2502554 | 2/2016 |
| JP | H06157715 A | 6/1994 |
| JP | 2007518840 A | 7/2007 |
| JP | 2009167251 A | 7/2009 |
| WO | 0105584 | 1/2001 |
| WO | 2017133864 | 8/2017 |
| WO | 2018169609 A1 | 9/2018 |
| WO | 2018195524 A1 | 10/2018 |

OTHER PUBLICATIONS

Sotta, Dane et al., "Application of electrochemical impedance spectroscopy to the study of ionic transport in polymer-based electrolytes", Progress in Organic Coatings (2010).

Leijonmarck, Simon et al., "Electrochemical Characterization of Electrically Induced Adhesive Debonding", Journal of the Electrochemical Society; vol. 158, No. 10, p. P. 109-P114 (2011).

Leijonmarck, Simon et al., "Electrolytically assisted debonding of adhesives: An experimental investigation", International Journal of Adhesion and Adhesives (2012).

* cited by examiner

TWO COMPONENT (2K) CURABLE ADHESIVE COMPOSITION

FIELD OF THE INVENTION

The present invention is directed to an adhesive composition which can be debonded from particular substrates to which it is applied. More particularly, the present invention is directed to a two-part (2K) curable and debondable hybrid adhesive composition.

BACKGROUND TO THE INVENTION

Adhesive bonds and polymeric coatings are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue and seal the joints from corrosive species.

Whilst adhesive bonds thus offer many advantages over mechanical fasteners, it tends to be difficult to disassemble adhesively bonded objects where this is required in practical applications. The removal of the adhesive through mechanical processes—such as by sand blasting or by wire brushing—is often precluded, in part because the adhesive is disposed between substrates and is thus either inaccessible or difficult to abrade without corrupting the substrate surfaces. Disassembly through the application of chemicals and/or high temperature—such as disclosed in U.S. Pat. No. 4,171,240 (Wong) and U.S. Pat. No. 4,729,797 (Linde et al.)—might be effective but can be time consuming and complex to perform: moreover, the aggressive chemicals and/or harsh conditions required can damage the substrates being separated, rendering them unsuitable for subsequent applications.

Noting these problems, certain authors have sought to develop debondable adhesive compositions, wherein the passage of an electrical current through the cured compositions acts to disrupt the bonding at the interface of the adhesive and the substrate.

U.S. Pat. No. 7,465,492 (Gilbert) describes an disbondable composition comprising: a matrix functionality comprising a monomer selected from the group consisting of acrylics, methacrylics and combinations thereof; a free radical initiator; and, an electrolyte, wherein the electrolyte provides sufficient ionic conductivity to said composition to support a faradaic reaction at a bond formed between the composition and an electrically conductive surface and thus allows the composition to disbond from the surface.

US 2007/0269659 (Gilbert) describes an adhesive composition disbondable at two interfaces, the composition: (i) comprising a polymer and an electrolyte; (ii) facilitating joinder of two surfaces; and, (iii) in response to a voltage applied across both surfaces so as to form an anodic interface and a cathodic interface, disbonding from both the anodic and cathodic surfaces.

US 2008/0196828 (Gilbert) describes a hot-melt adhesive composition comprising: a thermoplastic component; and, an electrolyte, wherein the electrolyte provides sufficient ionic conductivity to the composition to enable a faradaic reaction at a bond formed between the composition and an electrically conductive surface and to allow the composition to disbond from the surface.

WO2017/133864 (Henkel A G & Co. KGaA) describes a method for reversibly bonding a first and a second substrate, wherein at least the first substrate is an electrically non-conductive substrate, the method comprising: a) coating the surface of the electrically non-conductive substrate(s) with a conductive ink; b) applying an electrically debondable hot melt adhesive composition to the conductive ink-coated surface of the first substrate and/or the second substrate; c) contacting the first and the second substrates such that the electrically debondable hot melt adhesive composition is interposed between the two substrates; d) allowing formation of an adhesive bond between the two substrates to provide bonded substrates; and, e) applying a voltage to the bonded substrates whereby adhesion at least one interface between the electrically debondable hot melt adhesive composition and a substrate surface is substantially weakened.

There remains a need in the art to provide an adhesive composition which can be conveniently applied to the surfaces of substrates to be bonded, which upon curing thereof can provide an effective bond within composite structures containing said substrates but which can be effectively de-bonded from those substrates by the facile application of an electrical potential across the cured adhesive.

STATEMENT OF THE INVENTION

In accordance with a first aspect of the invention, there is provided a curable and debondable two-part (2K) hybrid adhesive composition comprising:
a first part comprising:
  a) epoxy resin;
  b) (meth)acrylate monomer;
  c) an electrolyte;
  d) a solubilizer; and
  e) a filler; and,
a second part comprising:
  a) a curing agent consisting of at least one compound possessing at least two epoxide reactive groups per molecule;
  b) ban accelerator; and,
  c) a filler.

In important embodiments of the invention, the two part (2K) hybrid adhesive composition comprises:
a first part comprising, based on the weight of said first part:
  from 15 to 60 wt. %, preferably from 15 to 50 wt. %, of said epoxy resin;
  from 5 to 50 wt. %, preferably from 10 to 30 wt. %, of said (meth)acrylate monomer;
  from 2.5 to 25 wt. %, preferably 5 to 20% of said electrolyte;
  from 0.5 to 20 wt. %, preferably from 1 to 15 wt. % of said solubilizer; and,
  said filler; and,
a second part comprising, based on the weight of said second part:
  a curing agent consisting of at least one compound possessing at least two epoxide reactive groups per molecule;
  from 0.1 to 15 wt. %, preferably from 2 to 10 wt. %, of accelerator; and,
  said filler.

In the first part of the adhesive composition, said electrolyte is preferably selected from the group consisting of 1-ethyl-3-methylimidazolium methansulfonate, 1-ethyl-3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di(2-hydroxyethyl) ammonium trifluoroaetate, N,N-dimethyl (2-hydroxyethyl) ammonium octanoate, methyltrioctylammonium bis (trifluoromethylsulfonyl) imide, N-ethyl-N—N—N—N-tetramethylguanidinium trifluoromethanesulfonate, guanidinium trifluoromethanesulfonate, 1-butyl-4-methylpyridinium bromide, 1-buthyl-3-methylpyridinium tetrafluoroborate, 1-butyl-3-hydroxymethylpyridinium ethylsulfate, 1-butyl-1-methylpyrrolidinium bis (trifluoromethylsulfonyl) imide, 1-butyl-methylpyrrolidinium tris (pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2,3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris (pentafluoroethyl) trifluorophosphate, trihexyl (tetradecyl) phosphonium tetrafluoroborate and mixtures thereof. A particular preference for the use of at least one of 1-ethyl-3-methylimidazolium methansulfonate and 1-ethyl-3-methylimidazolium methyl sulfate may be mentioned.

Independently of or additional to this statement of preference for the electrolyte in the first part, it is preferred that said solubilizer is selected from: polyphosphazenes; polymethylenesulfides; polyoxyalkylene glycols; polyethylene imines; silicone surfactants and fluorinated silicone surfactants; co-polymers of functionalized polyalkylsiloxanes and epoxy resins; polyhydric alcohols; and, sugars.

In the second part of the composition, it is preferred that said curing agent comprises at least one polyamine having at least two amine hydrogens reactive toward epoxide groups, said polyamine being further characterized by containing primary and/or secondary amine groups and having an equivalent weight per primary or secondary amine group of not more than 150 g/eq. A particular preference for the use of ether group-containing aliphatic primary polyamines may be mentioned in this regard.

Independently of or additional to this statement of preference for the curing agent of the second part of the composition, it is preferred that said accelerator is selected from the group consisting of tertiary amines, quaternary ammonium salts, amidines, guanidines and mixtures thereof. A particular preference is noted for employing at least one accelerator selected from imidazole, methylimidazole, benzyldimethylamine, 1,8-diazabicyclo[5.4.0]undec-7-ene and 1,4-diazabicyclo(2,2,2) octane.

In accordance with a second aspect of the invention, there is provided a bonded structure comprising:
   a first material layer having an electrically conductive surface; and,
   a second material layer having an electrically conductive surface, wherein the cured debondable two-part (2K) hybrid adhesive composition as defined hereinabove and in the appended claims is disposed between said first and second material layers.

In accordance with a third aspect of the present invention, there is provided a method of debonding said bonded structure as defined hereinabove and in the appended claims, the method comprising the steps of:
   i) applying a voltage across both surfaces to form an anodic interface and a cathodic interface; and,
   ii) debonding the surfaces.
Step i) of this method is preferably characterized by at least one of:
   a) an applied voltage of from 0.5 to 200 V; and,
   b) the voltage being applied for a duration of from 1 second to 60 minutes.
Definitions As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0 to x" specifically includes 0 wt. %: the ingredient defined by said range may be absent from the composition or may be present in the composition in an amount up to x wt. %.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

"Two-part (2K) compositions" in the context of the present invention are understood to be compositions in which a first part (A) and a second part (B) must be stored in separate vessels because of their (high) reactivity. The two parts are mixed only shortly before application and then react, typically without additional activation, with bond formation and thereby formation of a polymeric network. Herein higher temperatures may be applied in order to accelerate the cross-linking reaction.

As used herein the term "debondable" means that, after curing of the adhesive, the bond strength can be weakened by at least 50% upon application of an electrical potential of from 10V-75V for a duration of from 1s to 60 minutes. The cured adhesive is applied between two substrates which are bonded by said adhesive so that an electric current is running through the adhesive bond line. Bond strength is measured by Tensile Lap Shear (TLS) test performed at room temperature and based upon EN 1465:2009 (German version) Based on Adhesives—Determination of tensile lap-shear strength of bonded assemblies. The bond overlapping area was 25 mm×10 mm with a bond thickness of about 150 μm.

As used herein, the term "monomer" refers to a substance that can undergo a polymerization reaction to contribute constitutional units to the chemical structure of a polymer. The term "monofunctional", as used herein, refers to the possession of one polymerizable moiety. The term "polyfunctional", as used herein, refers to the possession of more than one polymerizable moiety.

As used herein, the term "equivalent (eq.)" relates, as is usual in chemical notation, to the relative number of reactive groups present in the reaction.

The term "electrolyte" is used herein in accordance with its standard meaning in the art as a substance containing free ions which can conduct electricity by displacement of charged carrier species. The term is intended to encompass molten electrolytes, liquid electrolytes, semi-solid electrolytes and solid electrolytes wherein at least one of the cationic or anionic components of their electrolyte structure is essentially free for displacement, thus acting as charge carrier.

The curable adhesive compositions of the present invention and the cured adhesives obtained therefrom possess "electrolyte functionality" in that the adhesive material permits the conduction of ions, either anions, cations or both. The electrolyte functionality is understood to derive from the ability of the compositions and cured adhesives to solvate ions of at least one polarity.

As used herein, "(meth)acryl" is a shorthand term referring to "acryl" and/or "methacryl". Thus, the term "(meth)acrylamide" refers collectively to acrylamide and methacrylamide.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. Where applicable, a preference for a given substituent will be noted in the specification. In general, however, a preference for alkyl groups containing from 1-18 carbon atoms ($C_1$-$C_{18}$ alkyl)— for example alkyl groups containing from 1 to 12 carbon atoms ($C_1$-$C_{12}$ alkyl) or from 1 to 6 carbon atoms ($C_1$-$C_6$ alkyl)—should be noted.

The term "$C_1$-$C_{18}$ hydroxyalkyl" as used herein refers to a HO-(alkyl) group having from 1 to 18 carbon atoms, where the point of attachment of the substituent is through the oxygen-atom and the alkyl group is as defined above.

An "alkoxy group" refers to a monovalent group represented by —OA where A is an alkyl group: non-limiting examples thereof are a methoxy group, an ethoxy group and an iso-propyloxy group. The term "$C_1$-$C_{18}$ alkoxyalkyl" as used herein refers to an alkyl group having an alkoxy substituent as defined above and wherein the moiety (alkyl-O-alkyl) comprises in total from 1 to 18 carbon atoms: such groups include methoxymethyl (—$CH_2OCH_3$), 2-methoxyethyl (—$CH_2CH_2OCH_3$) and 2-ethoxyethyl.

The term "$C_2$-$C_4$ alkylene" as used herein, is defined as saturated, divalent hydrocarbon radical having from 2 to 4 carbon atoms.

The term "$C_3$-$C_{30}$ cycloalkyl" is understood to mean an optionally substituted, saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; ($C_1$-$C_4$)alkylphenyl, such as tolyl and ethylphenyl; indenyl; naphthalenyl; tetrahydronaphthyl; tetrahydroindenyl; tetrahydroanthracenyl; and, anthracenyl. And a preference for phenyl groups may be noted.

As used herein, "$C_2$-$C_{20}$ alkenyl" refers to hydrocarbyl groups having from 2 to 20 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: —CH=$CH_2$; —CH=$CHCH_3$; —$CH_2$CH=$CH_2$; —C(=$CH_2$)($CH_3$); —CH=$CHCH_2CH_3$; —$CH_2$CH=$CHCH_3$; —$CH_2CH_2$CH=$CH_2$; —CH=C($CH_3$)$_2$; —$CH_2$C(=$CH_2$)($CH_3$); —C(=$CH_2$)$CH_2CH_3$; —C($CH_3$)=$CHCH_3$; —C($CH_3$)CH=$CH_2$; —CH=$CHCH_2CH_2CH_3$; —$CH_2$CH=$CHCH_2CH_3$; —$CH_2CH_2$CH=$CHCH_3$; —$CH_2CH_2CH_2$CH=$CH_2$; —C(=$CH_2$)$CH_2CH_2CH_3$; —C($CH_3$)=$CHCH_2CH_3$; —CH($CH_3$)CH=CHCH; —CH($CH_3$)$CH_2$CH=$CH_2$; —$CH_2$CH=C($CH_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

As used herein, "alkylaryl" refers to alkyl-substituted aryl groups and "substituted alkylaryl" refers to alkylaryl groups further bearing one or more substituents as set forth above. Further, as used herein "aralkyl" means an alkyl group substituted with an aryl radical as defined above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl", "heterocycloalkyl" and "heteroaryl" moieties are alkyl, cycloalkyl and aryl groups as defined hereinabove, respectively, containing N, O, Si or S as part of their structure.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

As employed herein a "primary amino group" refers to an $NH_2$ group that is attached to an organic radical, and a "secondary amino group" refers to an NH group that is attached to two organic radicals, which may also together be part of a ring. The term "tertiary amine" thus references a nitrogen bearing moiety of which a nitrogen atom is not bound to a hydrogen atom. Where used, the term "amine hydrogen" refers to the hydrogen atoms of primary and secondary amino groups.

The term "equivalent weight" as used herein refers to the molecular weight divided by the number of a function concerned. As such, "epoxy equivalent weight" (EEW) means the weight of resin, in grams, that contains one equivalent of epoxy.

The "amine equivalent weight" is a calculated value (g/eq.) determined from the amine number. That amine number is determined by titration of the amine acetate ion by a dilute, typically 1N HCl solution. For a pure material, the amine number can be calculated using the molecular weights of the pure compound and KOH (56.1 g/mol).

The term "Lewis acid" used herein denotes any molecule or ion—often referred to as an electrophile—capable of combining with another molecule or ion by forming a covalent bond with two electrons from the second molecule or ion: a Lewis acid is thus an electron acceptor.

The molecular weights referred to in this specification can be measured with gel permeation chromatography (GPC) using polystyrene calibration standards, such as is done according to ASTM 3536.

Viscosities of the compositions described herein are, unless otherwise stipulated, measured using the Anton Paar Viscometer, Model MCR 301 at standard conditions of 25° C. and 50% Relative Humidity (RH). The viscometer is calibrated one time a year and checked by services. The calibration is done with using special oil of known viscosity, which vary from 5,000 cps to 50,000 cps (parallel plate PP25 and at shear rate 1 1/s at 23° C.). Measurements of the compositions according to the present invention are done using the parallel plate PP20 at different shear rates from 1.5 1/s to 100 1/s.

DETAILED DESCRIPTION OF THE INVENTION

The two-part (2K) composition of the present invention is characterized by the presence of fillers in both parts thereof. The composition of the filler in each part is independently determined and, as such, may be the same or different for each part. Moreover, the fillers of each part may be constituted by electrically conductive fillers, electrically non-conductive fillers or mixtures thereof.

Broadly, there is no particular intention to limit the shape of the particles employed as electrically conductive fillers: particles that are acicular, spherical, ellipsoidal, cylindrical, bead-like, cubic or platelet-like may be used alone or in combination. Moreover, it is envisaged that agglomerates of more than one particle type may be used. Equally, there is no particular intention to limit the size of the particles employed as conductive fillers. However, such conductive fillers will conventionally have an average volume particle size, as measured by laser diffraction/scattering methods, of from 1 to 500 μm, for example from 1 to 200 μm.

Exemplary conductive fillers include, but are not limited to: silver; copper; gold; palladium; platinum; nickel; gold or silver-coated nickel; carbon black; carbon fibre; graphite; aluminium; indium tin oxide; silver coated copper; silver coated aluminium; metallic coated glass spheres; metallic coated filler; metallic coated polymers; silver coated fibre; silver coated spheres; antimony doped tin oxide; conductive nanospheres; nano silver; nano aluminium; nano copper; nano nickel; carbon nanotubes; and, mixtures thereof. The use of particulate silver and/or carbon black as the conductive filler is preferred.

In certain important embodiments, the electrically conductive fillers should be included in the composition in an amount of from 0 to 10 wt. %, for example in an amount up to 5 wt. % based on the total weight of the composition.

Broadly, there is also no particular intention to limit the shape of the particles employed as electrically non-conductive fillers: particles that are acicular, spherical, ellipsoidal, cylindrical, bead-like, cubic or platelet-like may be used alone or in combination. Moreover, it is envisaged that agglomerates of more than one particle type may be used. Equally, there is no particular intention to limit the size of the particles employed as non-conductive fillers. However, such non-conductive fillers will conventionally have an average volume particle size, as measured by laser diffraction/scattering methods, of from 0.1 to 1500 μm, for example from 1 to 1000 μm or from 1 to 500 μm.

Exemplary non-conductive fillers include but are not limited to calcium carbonate, calcium oxide, calcium hydroxide (lime powder), precipitated and/or pyrogenic silicic acid, zeolites, bentonites, wollastonite, magnesium carbonate, diatomite, barium sulphate, alumina, clay, talc, sand, quartz, flint, mica, glass beads, glass powder, and other ground mineral substances. Short fibres such as glass fibres, glass filament, polyacrylonitrile, carbon fibres, or polyethylene fibres can also be added.

The pyrogenic and/or precipitated silicic acids advantageously have a BET surface area from 10 to 90 $m^2/g$. When they are used, they do not cause any additional increase in the viscosity of the composition according to the present invention but do contribute to strengthening the cured composition.

It is likewise conceivable to use pyrogenic and/or precipitated silicic acids having a higher BET surface area, advantageously from 100 to 250 $m^2/g$ as a filler: because of the greater BET surface area, the effect of strengthening the cured composition is achieved with a smaller proportion by weight of silicic acid.

Also, suitable as non-conductive fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 μm or less, more preferably from 100 to 200 μm.

Non-conductive fillers which impart thixotropy to the composition may be preferred for many applications: such fillers are also described as rheological adjuvants, e.g. hydrogenated castor oil, fatty acid amides, or swellable plastics such as PVC.

In a highly preferred embodiment, the filler in the first part and said filler in the second part can be same or different and are independently selected from the group consisting of calcium carbonate, calcium oxide, talcum, fumed silica, silica, wollastonite, barium sulphate, glass beads and mixtures thereof.

Above listed fillers are preferred as they provide desired properties to the composition such as improved adhesion properties (wollastonite); improved aging properties and removal of water (barium sulphate and calcium carbonate); ideal spacing (glass beads) and improved hydrophobicity and rheology (fumed silica).

In a highly preferred embodiment, the composition according to the present invention comprises fumed silica as a filler.

Hydrophobicity may be required by the electrolyte for it to be dissolved into the composition and to avoid phase separation. Preferred fillers, and especially fumed silica, provide required hydrophobicity to the composition, and therefore, improve solubility of the electrolyte and prevent phase separation. Further, the technical data indicates that the presence of a non-electrically conductive filler improves the initial adhesive properties of the composition.

The desired viscosities of each part of the composition independently and also the desired viscosity of the curable composition formed upon bringing the two parts together may be determinative of the amount of filler used. Having regard to that latter consideration, the total amount of fillers—both electrically conductive and non-conductive—present in the compositions should not prevent the composition from being readily extrudable from a suitable dispensing apparatus, such as a tube: conventionally such extrudable curable compositions should possess a viscosity of from 3000 to 150,000, preferably from 40,000 to 80,000 mPas, or even from 50,000 to 60,000 mPas.

It is preferred that the first part of the composition comprises from 1 to 40 wt. % of filler, based on the weight of said part: filler should desirably constitute from 1 to 25 wt. %, for example from 1.5 to 18 wt. % of said first part. Independently of this statement of preference, it is desired that the second part of the composition comprises from 10 to 30 wt. %, preferably from 15 to 13 wt. %, of filler based on the weight of said part.

First Part of the Two-Part (2K) Composition

The first part of the two-part (2K) composition comprises: epoxy resin; (meth)acrylate monomer; electrolyte; solubilizer; and, filler.

Epoxy Resin

The first part of the composition comprises epoxy resin which will typically be present in an amount of from 15 to 60 wt. %, based on the weight of said first part: it is preferred that the epoxy resin constitutes from 15 to 50 wt. %, more preferably from 20 to 45 wt. %, for example from 25 to 40 wt. % or from 28 to 39 wt. % of said first part.

These epoxy resin quantities are preferred because quantity greater than 60% may adversely adhesion properties and flexibility of the composition, whereas low quantities, mainly below 15% may lead to higher shrinkage.

Epoxy resins as used herein may include mono-functional epoxy resins, multi- or poly-functional epoxy resins, and combinations thereof. The epoxy resins may be pure compounds but equally may be mixtures epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may also be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an embodiment, the monoepoxide compound conforms to Formula (I) herein below:

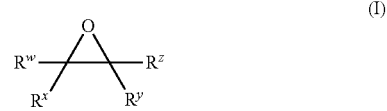

(I)

wherein: $R^w$, $R^x$, $R^y$ and $R^z$ may be the same or different and are independently selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^y$ and $R^z$ is not hydrogen.

It is preferred that $R^w$, $R^x$ and $R^y$ are hydrogen and $R^z$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, reference is made to using at least one monoepoxide compound selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and, cyclododecene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a cost standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid $C_1$-$C_{18}$ alkyl esters; butadiene diepoxide; polybutadiene diglycidyl ether; vinylcyclohexene diepoxide; and, limonene diepoxide.

Further illustrative polyepoxide compounds include but are not limited to: glycerol polyglycidyl ether; trimethylolpropane polyglycidyl ether; pentaerythritol polyglycidyl ether; digylcerol polyglycidyl ether; polyglycerol polyglycidyl ether; and, sorbitol polyglycidyl ether.

And examples of highly preferred polyepoxide compounds include: bisphenol-A epoxy resins, such as DER™ 331, and DER™ 383; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; and, sorbitol glycidyl ether, such as ERISYS™ GE-60.

The above aside, the first part of the composition can in certain embodiments comprise glycidoxy alkyl alkoxy silanes having the formula:

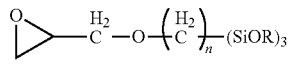

wherein: each R is independently selected from methyl or ethyl; and,
n is from 1-10.

Exemplary silanes include but are not limited to: γ-glycidoxy propyl trimethoxy silane, γ-glycidoxy ethyl trimethoxy silane, γ-glycidoxy methyl trimethoxy silane, γ-glycidoxy methyl triethoxy silane, γ-glycidoxy ethyl triethoxy silane, γ-glycidoxy propyl triethoxy silane; and, 8-glycidooxyoctyl trimethoxysilane. When present, the epoxide functional silanes should constitute less than 20 wt. %, preferably less than 10 wt. % or less than 5 wt. %, based on the total weight of the epoxide compounds.

The present invention also does not preclude the first part of the curable compositions from further comprising one or more cyclic monomers selected from the group consisting of: oxetanes; cyclic carbonates; cyclic anhydrides; and, lactones. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and, EP-A-0 119 840. However, such cyclic co-monomers should constitute less than 20 wt. %, preferably less than 10 wt. % or less than 5 wt. %, based on the total weight of the epoxide compounds.

(Meth)Acrylate Monomer

The first part of the composition comprises (meth)acrylate monomer which will typically be present in an amount of from 5 to 50 wt. %, based on the weight of said first part: it is preferred that (meth)acrylate monomer constitutes from 7 to 40 wt. %, for example from 10 to 30 wt. % or from 15 to 27 wt. % of said first part.

These (meth)acrylate monomer quantities are preferred because quantity greater than 50% may lead to high shrinkage of the composition, whereas low quantities, mainly below 5% may lead poor flexibility of the composition.

In an alternative statement of preference for the composition, which is not intended to be mutually exclusive of that given above, the weight ratio of epoxy resin to (meth)acrylate monomers should be in the range from 4:1 to 1:1, preferably from 4:1 to 2:1, for example from 4:1 to 2.5:1.

There is no particular intention to limit the (meth)acrylate monomers having utility herein and it is considered that the (meth)acrylate monomers may be any ester of acrylic acid or methacrylic acid known to the art. That said, exemplary (meth)acrylic monomers include but are not limited to:

$C_1$-$C_{18}$ alkyl esters of (meth)acrylic acid, such as methyl (meth)acrylate, ethyl (meth)acrylate, n-propyl (meth)acrylate, isopropyl (meth)acrylate, butyl (meth)acrylate (all isomers), hexyl (meth)acrylate, n-heptyl(meth) acrylate, n-octyl(meth)acrylate, 2-ethylhexyl (meth) acrylate, n-nonyl(meth)acrylate, n-decyl(meth)acrylate, n-dodecyl(meth)acrylate and n-stearyl(meth) acrylate;

$C_3$-$C_{18}$ cycloalkyl esters of (meth)acrylic acid, such as cyclohexyl(meth)acrylate and isobornyl(meth)acrylate;

$C_6$-$C_{18}$ aryl esters of (meth)acrylic acid, such as phenyl (meth)acrylate and tolyl(meth)acrylate;

$C_7$-$C_{24}$ aralkyl esters of (meth)acrylic acid, such as benzyl (meth)acrylate;

$C_1$-$C_{18}$ alkoxyalkyl esters of (meth)acrylic acid, such as 2-methoxyethyl(meth)acrylate, 2-ethoxyethyl(meth) acrylate and 3-methoxybutyl(meth)acrylate;

fluorine-containing $C_1$-$C_{18}$ alkyl esters of (meth)acrylic acid, such as trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl (meth)acrylate and 2-perfluorohexadecylethyl(meth) acrylate;

$C_1$-$C_{18}$ hydroxyalkyl esters of (meth)acrylic acid, such as 2-hydroxyethyl(meth)acrylate, 2-hydroxypropyl(meth) acrylate and pentaerythritol tri(meth)acrylate;

di/poly-esters of di/poly-functional alcohols, such as ethylene glycol di(meth)acrylate, 1,3 or 1,4-butanediol di(meth)acrylate, 1,6-hexanediol di(meth)acrylate and trimethylolpropane tri(meth)acrylate;

$C_1$-$C_{18}$ aminoalkyl esters of (meth)acrylic acid, such as 2-aminoethyl(meth)acrylate, dimethylaminoethyl (meth)acrylate and (meth)acryloxyethoxyethylamine;

$C_1$-$C_{18}$ alkoxysilyl-containing alkyl esters of (meth)acrylic acid, such as γ-(methacryloyloxypropyl)trimethoxysilane;

ethylene oxide or propylene oxide adducts of (meth)acrylic acid; and, (meth)acrylate esters formed by alcohols bearing other functional groups, such as tetrahydrofurfuryl (meth)acrylate.

For completeness, it is not precluded that the first part of the composition comprises a macro-monomer component consisting of one or more oligomers selected from the group consisting of urethane (meth)acrylates, polyester (meth)acrylates and polyether (meth)acrylates. However, such oligomeric compounds—which may be mono- or polyfunctional with respect to the polymerizable (meth)acrylate functionality but which are based on repeated structural urethane, ester and ether subunits—should not usually constitute more than 30 wt. % of the total of (meth)acrylate monomers in said first part.

As is known in the art, urethane (meth)acrylate oligomers may be prepared by reaction of a polyfunctional (meth)acrylate bearing a hydroxyl group with a polyisocyanate as defined herein above. In particular, the polyfunctional (meth)acrylate bearing a hydroxyl group may be selected from the group consisting of: 2-hydroxyethyl (meth)acrylate; 2-hydroxyisopropyl (meth)acrylate; 4-hydroxybutyl (meth)acrylate; hydroxyethylcaprolactone (meth)acrylate; pentaerythritol tri(meth)acrylate; pentaerythritol tetra(meth)acrylate; dipentaerythritol penta(meth)acrylate; dipentaerythritol hexa(meth)acrylate; and, combinations thereof.

Suitable polyester (meth)acrylate oligomers are obtained by reacting (meth)acrylic acid with a polyester prepared from a polybasic acid or an anhydride thereof and a polyhydric alcohol. Examples of the polybasic acid include, but are not limited to: phthalic acid; succinic acid; adipic acid; glutaric acid; sebacic acid; isosebacic acid; tetrahydrophthalic acid; hexahydrophthalic acid; dimer acid; trimellitic acid; pyromellitic acid; pimelic acid; and, azelaic acid. Examples of the polyhydric alcohol include but are not limited to: 1,6-hexanediol; diethylene glycol; 1,2-propylene glycol; 1,3-butylene glycol; neopentyl glycol; dipropylene glycol; polyethylene glycol; and, polypropylene glycol.

As is known in the art, polyether (meth)acrylate oligomers may be obtained by an ester exchange reaction between a polyether and a (meth)acrylate ester, such as ethyl methacrylate. Exemplary polyethers include polyethers obtained from ethoxylated or propoxylated trimethylolpropane, pentaerythritol or the like, or by polyetherification of 1,4-propanediol or the like.

In a preferred embodiment, the first part comprises at least one (meth)acrylate monomer selected from the group consisting of: methyl (meth)acrylate; ethyl (meth)acrylate; n-propyl (meth)acrylate; isopropyl (meth)acrylate; n-butyl (meth)acrylate; isobutyl (meth)acrylate; tert-butyl (meth)acrylate; n-pentyl (meth)acrylate; n-hexyl (meth)acrylate; cyclohexyl (meth)acrylate; n-heptyl (meth)acrylate; n-octyl (meth)acrylate; 2-ethylhexyl-(meth)acrylate; nonyl (meth)acrylate; decyl (meth)acrylate; dodecyl (meth)acrylate; phenyl (meth)acrylate; tolyl (meth)acrylate; benzyl (meth)acrylate; 2-methoxyethyl (meth)acrylate; 3-methoxybutyl (meth)acrylate; 2-hydroxyethyl (meth)acrylate; 2-hydroxypropyl(meth)acrylate; stearyl(meth)acrylate; glycidyl (meth)acrylate; isobornyl (meth)acrylate; 2-aminoethyl (meth)acrylate; γ-(meth)acryloyloxypropyl trimethoxysilane; (meth)acrylic acid-ethylene oxide adduct; trifluoromethylmethyl (meth)acrylate; 2-trifluoromethylethyl (meth)acrylate; 2-perfluoro ethylethyl (meth)acrylate; 2-perfluoroethyl-2-perfluorobutylethyl (meth)acrylate; 2-perfluoroethyl (meth)acrylate; perfluoromethyl (meth)acrylate; diperfluoromethylmethyl (meth)acrylate; 2-perfluoromethyl-2-perfluoroethylmethyl (meth)acrylate; 2-perfluorohexylethyl (meth)acrylate; 2-perfluorodecylethyl (meth)acrylate; 2-perfluorohexadecylethyl (meth)acrylate; ethoxylated trimethylolpropane triacrylate; trimethylol propane trimethacrylate; dipentaerythritol monohydroxypentacrylate; pentaerythritol triacrylate; ethoxylated trimethylolpropane triacrylate; 1,6-hexanedioldiacrylate; neopentyl glycoldiacrylate; pentaerythritol tetraacrylate; 1,2-butylene glycoldiacrylate; trimethylopropane ethoxylate tri(meth)acrylate; glyceryl propoxylate tri(meth)acrylate; trimethylolpropane tri(meth)acrylate; dipentaerythritol monohydroxy penta(meth)acrylate; tripropyleneglycol di(meth)acrylate; neopentylglycol propoxylate di(meth)acrylate; 1,4-butanediol di(meth)acrylate; triethyleneglycol di(meth)acrylate; butylene glycol di(meth)acrylate; and, ethoxylated bisphenol A di(meth)acrylate.

Good results have been obtained where the first part comprises at least one (meth)acrylate monomer selected from the group consisting of methyl (meth)acrylate, ethyl (meth)acrylate, isobornyl (meth)acrylate, ethoxylatedtrimethylolpropanetriacrylate and trimethylolpropane triacrylate and mixtures thereof.

Above listed (meth)acrylate monomers are preferred because it is believed that the size of the monomer leads to a formation of an ideal polymer network, which increases ion transport.

Acid Monomers Co-Polymerizable with the (Meth)Acrylate Monomers

The first part of the composition may optionally comprise acid monomers which are co-polymerizable with the (meth)acrylate monomers. When so-included, such co-polymerizable acids should constitute up to 50 wt. %, preferably from 10 to 40 wt. %, based on the total weight of (meth)acrylate monomers. For completeness, whilst such monomers should typically be used in the form of free acid, it is not precluded that the constituent acid groups of the monomers be partially or completely neutralized with suitable bases, provided this does not compromise their participation in co-polymerization.

These co-polymerizable acid quantities are preferred because quantity greater than 50% may cause corrosion issues and gas evolution, whereas low quantities may lead to an incomplete cure and therefore decrease initial adhesion properties.

Without intention to limit the present invention, co-polymerizable acid monomers should be selected from: ethylenically unsaturated carboxylic acids; ethylenically unsaturated sulfonic acids; and; vinylphosphonic acid. Suitable ethylenically unsaturated sulfonic acids are, for instance, vinylsulfonic acid, styrenesulfonic acid and acrylamidomethylpropanesulfonic acid.

Preferably the co-polymerizable acid of this part comprises or consists of ethylenically unsaturated carboxylic acids selected from the group consisting of: α,β-monoethylenically unsaturated monocarboxylic acids; α,β-monoethylenically unsaturated dicarboxylic acids; $C_1$-$C_6$ alkyl half-esters of α,β-monoethylenically unsaturated dicarboxylic acids; α,β-monoethylenically unsaturated tricarboxylic acids; and, $C_1$-$C_6$ alkyl esters of α,β-monoethylenically unsaturated tricarboxylic acids bearing at least one free carboxylic acid group; and, mixtures thereof. In particular, the co-polymerizable acid of this part comprises or consists of at least one acid selected from methacrylic acid, acrylic acid, itaconic acid, maleic acid, aconitic acid, crotonic acid and fumaric acid.

Further Vinyl Monomers

Either independently of or additional to the presence of co-polymerizable acids, the first part of the composition can optionally comprise vinyl monomers which can be copolymerized with (meth)acrylate monomers and which are selected from the group consisting of: styrene monomers, such as styrene, vinyltoluene, α-methylstyrene and chlorostyrene; fluorine containing vinyl monomers, such as perfluoroethylene, perfluoropropylene and fluorinated vinylidene; silicon containing vinyl monomers such as vinyltrimethoxysilane and vinyltriethoxysilane; maleimide monomers, such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group containing vinyl monomers, such as acrylonitrile and methacrylonitrile; amide group containing vinyl monomers, such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allylalcohol. However, when included, such vinyl co-monomers should constitute less than 40 wt. %, preferably less than 20 wt. % or less than 10 wt. %, based on the total weight of (meth)acrylate monomers.

Electrolyte

The first part of the composition comprises from 2.5 to 25 wt. %, based on the weight of the first part, of electrolyte: the electrolyte may preferably constitute from 4 to 23 wt. %, for example from 5 to 20 wt. % of said first part.

These electrolyte quantities are preferred because quantity greater than 25% may lead to good debonding effect, however the cure may be incomplete and therefore, initial adhesive properties may be adversely affected, whereas low quantities, mainly below 2.5%, may lead to a lack of debonding effect.

The electrolyte preferably comprises at least one salt having a Formula selected from the group consisting of:

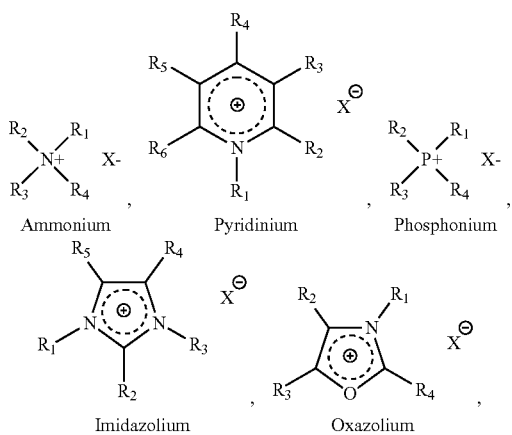

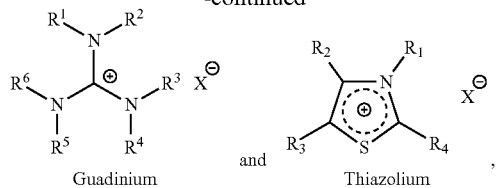

wherein: $R^1$, $R^2$, $R^3$, $R^4$, $R^5$ and $R^6$ are independently selected from hydrogen, $C_1$-$C_{18}$ alkyl, $C_3$-$C_{18}$ cycloalkyl, $C_6$-$C_{18}$ aryl, $C_7$-$C_{24}$ aralkyl, $C_2$-$C_{20}$ alkenyl, —C(O)$R^a$, —C(O)OH, —CN and —NO$_2$; and, $R^a$ is $C_1$-$C_6$ alkyl.

For completeness, the terms $C_1$-$C_{18}$ alkyl, $C_3$-$C_{18}$ cycloalkyl, $C_6$-$C_{18}$ aryl, $C_7$-$C_{24}$ aralkyl, $C_2$-$C_{20}$ alkenyl expressly includes groups wherein one or more hydrogen atoms are substituted by halogen atoms (e.g. $C_1$-$C_{18}$ haloalkyl) or hydroxyl groups (e.g. $C_1$-$C_{18}$ hydroxyalkyl). In particular, it is preferred that $R^1$, $R^2$, $R^3$, $R^4$, $R^5$ and $R^6$ are independently selected from hydrogen, $C_1$-$C_{12}$ alkyl, $C_1$-$C_{12}$ haloalkyl, $C_1$-$C_{12}$ hydroxyalkyl and $C_3$-$C_{12}$ cycloalkyl. For example, $R^1$, $R^2$, $R^3$, $R^4$, $R^5$ and $R^6$ may be independently selected from hydrogen, $C_1$-$C_6$ alkyl, $C_1$-$C_6$ haloalkyl and $C_1$-$C_6$ hydroxyalkyl.

There is no particular intention to limit the counter anion (X—) which may be employed in the electrolyte. Exemplary anions may be selected from:

Halides;

Pseudohalides and halogen-containing compounds of the formulae $PF_6^-$, $CF_3SO_3^-$, $(CF_3SO_3)_2N^-$, $CF_3CO_2^-$ and $CCl_3CO_2^-$, $CN^-$, $SCN^-$ and $OCN^-$;

Phenates;

Sulfates, sulfites and sulfonates of the general formulae $SO_4^{2-}$, $HSO_4^-$, $SO_3^{2-}$, $HSO_3^-$, $R^aOSO_3^-$ and $R^aSO_3^-$;

Phosphates of the general formulae $PO_4^{3-}$, $HPO_4^{2-}$, $H_2PO_4^-$, $R^aPO_4^{2-}$, $HR^aPO_4^-$ and $R^aR^bPO_4^-$;

Phosphonates and phosphinates of the general formulae $R^aHPO_3^-$, $R^aR^bPO_2^-$ and $R^aR^bPO_3^-$;

Phosphites of the general formulae: $PO_3^{3-}$, $HPO_3^{2-}$, $H_2PO_3^-$, $R^aPO_3^{2-}$, $R^aHPO_3^-$ and $R^aR^bPO_3$;

Phosphonites and phosphinates of the general formulae $R^aR^bPO_2^-$, $R^aHPO_2^-$, $R^aR^bPO^-$ and $R^aHPO^-$;

Carboxylic acid anions of the general formula $R^aCOO^-$;

Hydroxycarboxylic acids anions and sugar acid anions;

Saccharinates (salts of o-benzoic acid sulfimide);

Borates of the general formulae $BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$ and $B(R^aSO_4)^-$;

Boronates of the general formulae $R^aBO_2^{2-}$ and $R^aR^bBO^-$;

Carbonates and carbonic acid esters of the general formulae $HCO_3^-$, $CO_3^{2-}$ and $R^aCO_3^-$;

Silicates and silicic acid esters of the general formulae $SiO_4^{4-}$, $HSiO_4^{3-}$, $H_2SiO_4^{2-}$, $H_3SiO_4$, $R^aSiO_4^{3-}$, $R^aR^bSiO_4^{2-}$, $R^aR^bR^cSiO_4^-$, $HR^aSiO_4^{2-}$, $H_2R^aSiO_4^-$ and $HR^aR^bSiO_4^-$;

Alkyl- and arylsilanolates of the general formulae $R^aSiO_3^{3-}$, $R^aR^bSiO_2^{2-}$, $R^aR^bR^cSiO^-$, $R^aR^bR^cSiO_3$, $R^aR^bR^cSiO_2^-$ and $R^aR^bSiO_3^{2-}$;

Pyridinates and pyrimidinates;

Carboxylic acid imides, bis(sulfonyl)imides and sulfonylimides of the general formulae:

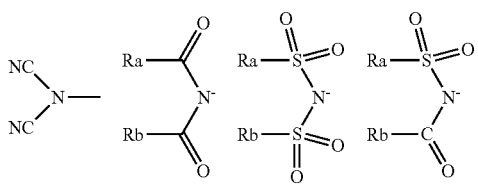

Methides of the general formula:

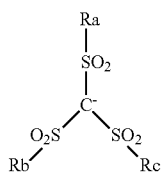

Alkoxides and aryloxides of the general formula $R^aO^-$; and,

Sulfides, hydrogen sulfides, polysulfides, hydrogen polysulfides and thiolates of the general formulae $S^{2-}$, $HS^-$, $[S_v]^{2-}$, $[HS_v]^-$ and $[R^aS]^-$ in which general formulae v is a whole positive number of from 2 to 10.

$R^a$, $R^b$, $R^c$ and $R^d$ are independently selected from hydrogen, a $C_1$-$C_{12}$ alkyl, $C_5$-$C_{12}$ cycloalkyl, $C_5$-$C_{12}$ heterocycloalkyl, $C_6$-$C_{18}$ aryl and $C_5$-$C_{18}$ heteroaryl.

Based on the definitions in the above list, preferred anions are selected from the group consisting of: halides; pseudohalides and halogen-containing compounds as defined above; carboxylic acid anions, in particular formate, acetate, propionate, butyrate and lactate; hydroxycarboxylic acid anions; pyridinates and pyrimidinates; carboxylic acid imides, bis(sulfonyl)imides and sulfonylimides; sulfates, in particular methyl sulfate and ethyl sulfate; sulfites; sulfonates, in particular methansulfonate; and, phosphates, in particular dimethyl-phosphate, diethyl-phosphate and di-(2-ethylhexyl)-phosphate.

The electrolyte of the first part is preferably selected from the group consisting of 1-ethyl-3-methylimidazolium methansulfonate, 1-ethyl-3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di(2-hydroxyethyl) ammonium trifluoroaetate, N,N-dimethyl (2-hydroxyethyl) ammonium octanoate, methyltrioctylammonium bis (trifluoromethylsulfonyl) imide, N-ethyl-N—N—N—N-tetramethylguanidinium trifluoromethanesulfonate, guanidinium trifluoromethanesulfonate, 1-butyl-4-methylpyridinium bromide, 1-butyl-3-methylpyridinium tetrafluoroborate, 1-butyl-3-hydroxymethylpyridinium ethylsulfate, 1-butyl-1-methylpyrrolidinium bis (trifluoromethylsulfonyl) imide, 1-butyl-methylpyrrolidinium tris (pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2,3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris (pentafluoroethyl) trifluorophosphate, trihexyl (tetradecyl) phosphonium tetrafluoroborate and mixtures thereof. A particular preference for the use of at least one of 1-ethyl-3-methylimidazolium methansulfonate and 1-ethyl-3-methylimidazolium methyl sulfate may be mentioned.

Above listed electrolytes are preferred because they provide good stability for the composition and provide good initial adhesion strength, and upon treatment with potential they provide good debonding effect.

Solubilizer

The first part of the two-part (2K) composition necessarily comprises a solubilizer which is conventionally present in an amount of from 0.5 to 20 wt. %, based on the weight of the first part: preferably the solubilizer constitutes from 1 to 15 wt. %, for example from 1 to 13 wt. % of said first part. The function of the solubilizer is not to improve or change the adhesion properties of the composition, but solubilizer increase the conductivity of the composition according to the present invention. Further, the solubilizer has the function of promoting the miscibility of the electrolyte within the adhesive composition formed upon admixture of the two parts thereof: the solubilizer may or may not form part of the polymer matrix formed upon curing of the adhesive composition but does serve to facilitate ion transfer therein. The solubilizer is, as such, preferably a polar compound and should desirably be liquid at room temperature.

These solubilizer quantities are preferred because quantity greater than 20% may adversely affect adhesion and cure properties, whereas low quantities, mainly below 0.5% may lead the first part of the composition being solid, and therefore, hinder blending of the first and second parts.

Suitable classes of solubilizer include: polyphosphazenes; polymethylenesulfides; polyoxyalkylene glycols; polyethylene imines; silicone surfactants and fluorinated silicone surfactants, such as fluorinated polysilanes, polyalkylsiloxane and polyoxyalkylene modified polydimethylsiloxanes; co-polymers of functionalized polyalkylsiloxanes and epoxy resins, such as copolymers of functionalized polydimethylsiloxane (PDMS) and epoxy resin; polpolyhydric alcohols; and, sugars.

Polyhydric alcohols and sugars such as ethylene glycol, 1,3-propanediol, cyclohexandiol, hydroquinone, catechol, resorcinol, phloroglucinol, pyrogallol, hydroxyhydroquinone, tris(hydroxymethyl)benzene, tris(hydroxymethyl)benzene with three methyl or ethyl substituents bonded to the remaining benzene carbon atoms, isosorbide, isomannide, isoidide, glycerol, cyclohexane-1,2,4-triol, 1,3,5-cyclohexanetriol, pentane-1,2,3-triol, hexane-1,3,5-triol, erythritol, 1,2,4,5-tetrahydroxybenzene, threitol, arabitol, xylitol, ribitol, mannitol, sorbitol, inositol, fructose, glucose, mannose, lactose, 1,1,1-tris(hydroxymethyl)propane, 1,1,1-tris (hydroxymethyl)ethane, di(trimethylolpropane), trimethylolpropane ethoxylate, 2-Hydroxymethyl-1,3-propanediol, pentaerythritol allyl ether and pentaerythritol.

Of the polyoxyalkylene glycols, a particular preference for the use of polyoxy($C_2$-$C_3$)alkylene glycols having a weight average molecular weight of from 200 to 10000 g/mol, for example 200 to 2000 g/mol, may be noted.

Second Part of the Two-Part (2K) Composition

The second part of the two-part composition comprises: a first curing agent; an accelerator; and, a filler as described hereinabove.

Curing Agent

The curative necessarily consists of at least one compound possessing at least two epoxide reactive groups per molecule. Curatives may, in particular, include one or more of: i) at least one polyamine having at least two amine hydrogens reactive toward epoxide groups; ii) at least one mercapto compound having at least two mercapto groups reactive toward epoxide groups; and, iii) at least one Mannich base.

The at least one polyamine having at least two amine hydrogens reactive toward epoxide groups should, in particular, contain primary and/or secondary amine groups and have an equivalent weight per primary or secondary amine group of not more than 150 g/eq., more preferably not more than 125 g/eq.

Suitable polyamines, which may be used alone or in combination, include but are not limited to the following:

i) Aliphatic, cycloaliphatic or arylaliphatic primary diamines of which the following examples may be mentioned: 2,2-dimethyl-1,3-propanediamine; 1,3-pentanediamine (DAMP); 1,5-pentanediamine; 1,5-diamino-2-methylpentane (MPMD); 2-butyl-2-ethyl-1,5-pentanediamine (C11-neodiamine); 1,6-hexanediamine (hexamethylenediamine, HMDA); 2,5-dimethyl-1,6-hexanediamine; 2,2,4- and/or 2,4,4-trimethylhexamethylenediamine; 1,7-heptanediamine; 1,8-octanediamine; 1,9-nonanediamine; 1,10-decanediamine; 1,11-undecanediamine; 1,12-dodecanediamine; 1,2-, 1,3- and 1,4-diaminocyclohexane; bis(4-aminocyclohexyl)methane; bis(4-amino-3-methylcyclohexyl)methane; bis(4-amino-3-ethylcyclohexyl)methane; bis(4-amino-3,5-dimethylcyclohexyl)methane; bis(4-amino-3-ethyl-5-methylcyclohexyl)methane; 1-amino-3-aminomethyl-3,5,5-trimethylcyclohexane (isophorone diamine, IPDA); 2- and/or 4-methyl-1,3-diaminocyclohexane; 1,3-bis(aminomethyl)-cyclohexane; 1,4-bis(aminomethyl)cyclohexane; 2,5(2,6)-bis(aminomethyl)-bicyclo[2.2.1]heptane (norbornane diamine, NBDA); 3(4),8(9)-bis(aminomethyl)tricyclo[5.2.1.0(2,6)]-decane (TCD-diamine); 1,4-diamino-2,2,6-trimethylcyclohexane (TMCDA); 1,8-menthanediamine; 3,9-bis(3-aminopropyl)-2,4,8,10-tetraoxaspiro[5.5]undecane; and, 1,3-bis(aminomethyl)benzene (MXDA).

ii) Tertiary amine group-containing polyamines with two or three primary aliphatic amine groups of which the following specific examples may be mentioned: N,N'-bis(aminopropyl)-piperazine; N,N-bis(3-aminopropyl)methylamine; N,N-bis(3-aminopropyl)ethylamine; N,N-bis(3-aminopropyl)propylamine; N,N-bis(3-aminopropyl)cyclohexylamine; N,N-bis(3-aminopropyl)-2-ethyl-hexylamine; tris(2-aminoethyl)amine; tris(2-aminopropyl)amine; tris(3-aminopropyl)amine; and, the products from the double cyanoethylation and subsequent reduction of fatty amines derived from natural fatty acids, such as N,N-bis(3-aminopropyl)dodecylamine and N,N-bis(3-aminopropyl)tallow alkylamine, commercially available as Triameen® Y12D and Triameen® YT (from Akzo Nobel).

iii) Ether group-containing aliphatic primary polyamines of which the following specific examples may be mentioned: bis(2-aminoethyl)ether; 3,6-dioxaoctane-1,8-diamine; 4,7-dioxadecane-1,10-diamine; 4,7-dioxadecane-2,9-diamine; 4,9-dioxadodecane-1,12-diamine; 5,8-dioxadodecane-3,10-diamine; 4,7,10-trioxatridecane-1,13-diamine and higher oligomers of these diamines; bis(3-aminopropyl)polytetrahydrofuranes and other polytetrahydrofuran diamines; cycloaliphatic ether group-containing diamines obtained from the propoxylation and subsequent amination of 1,4-dimethylolcyclohexane, such as that material commercially available as Jeffamine® RFD-270 (from Huntsman); polyoxyalkylenedi- or -triamines obtainable as products from the amination of polyoxyalkylenedi- and -triols and which are commercially available under the name of Jeffamine® (from Huntsman), under the name of polyetheramine (from BASF) or under the name of PC Amines® (from Nitroil). A particular preference may be noted for the use of Jeffamine® D-230, Jeffamine® D-400, Jeffamine® D-600, Jeffamine® D-2000, Jeffamine® D-4000, Jeffamine® T-403, Jeffamine® T-3000, Jeffamine® T-5000, Jeffamine® EDR-104, Jeffamine® EDR-148 and Jeffamine® EDR-176, as well as corresponding amines from BASF or Nitroil.

iv) Primary diamines with secondary amine groups of which the following examples may be mentioned: 3-(2-aminoethyl)aminopropylamine, bis(hexamethylene)triamine (BHMT); diethylenetriamine (DETA); triethylenetetramine (TETA); tetraethylenepentamine (TEPA); pentaethylenehexamine (PEHA); higher homologs of linear polyethyleneamines, such as polyethylene polyamines with 5 to 7 ethyleneamine units (so-called "higher ethylenepolyamine," HEPA); products from the multiple cyanoethylation or cyanobutylation and subsequent hydrogenation of primary di- and polyamines with at least two primary amine groups, such as dipropylenetriamine (DPTA), N-(2-aminoethyl)-1,3-propanediamine (N3-amine), N,N'-bis(3-aminopropyl)ethylenediamine (N4-amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine or N,N'-bis(3-amino-1-ethylpropyl)-2-methyl-1,5-pentanediamine.

v) Polyamines with one primary and at least one secondary amino group of which the following examples may be mentioned: N-butyl-1,2-ethanediamine; N-hexyl-1,2-ethanediamine; N-(2-ethylhexyl)-1,2-ethanediamine; N-cyclohexyl-1,2-ethanediamine; 4-aminomethyl-piperidine; N-(2-aminoethyl)piperazine; N-methyl-1,3-propanediamine; N-butyl-1,3-propanediamine; N-(2-ethylhexyl)-1,3-propanediamine; N-cyclohexyl-1,3-propanediamine; 3-methylamino-1-pentylamine; 3-ethylamino-1-pentylamine; 3-cyclohexylamino-1-pentylamine; fatty diamines such as N-cocoalkyl-1,3-propanediamine; products from the Michael-type addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a 1:1 molar ratio; products from the partial reductive alkylation of primary polyamines with aldehydes or ketones, especially N-monoalkylation products of the previously mentioned polyamines with two primary amine groups and in particular of 1,6-hexanediamine, 1,5-diamino-2-methylpentane, 1,3-bis(aminomethyl)cyclohexane, 1,4-bis(aminomethyl)cyclohexane, 1,3-bis(aminomethyl)benzene, BHMT, DETA, TETA, TEPA, DPTA, N3-amine and N4-amine, wherein preferred alkyl groups are benzyl, isobutyl, hexyl and 2-ethylhexyl; and, partially styrenated polyamines such as those commercially available as Gaskamine® 240 (from Mitsubishi Gas Chemical).

vi) Secondary diamines and, in particular, N,N'-dialkylation products of the previously mentioned polyamines with two primary amine groups, especially N,N'-dialkylation products of 1,6-hexanediamine, 1,5-diamino-2-methylpentane, 1,3-bis(aminomethyl)cyclohexane, 1,4-bis(aminomethyl)-cyclohexane, 1,3-bis(aminomethyl)benzene, BHMT, DETA, TETA, TEPA, DPTA, N3-amine or N4-amine, wherein preferred alkyl groups are 2-phenylethyl, benzyl, isobutyl, hexyl and 2-ethylhexyl.

vii) Aromatic polyamines of which mention may be made of: m- and p-phenylenediamine; 4,4'-, 2,4' and 2,2'-diaminodiphenylmethane; 3,3'-dichloro-4,4'-diaminodiphenylmethane (MOCA); 2,4 and 2,6-tolylenediamine; mixtures of 3,5-dimethylthio-2,4 and -2,6-tolylenediamine (available as Ethacure® 300 from Albemarle); mixtures of 3,5-diethyl-2,4 and -2,6-tolylene diamine (DETDA); 3,3',5,5'-tetraethyl-4,4'-diaminodiphenylmethane (M-DEA); 3,3',5,5'-tetraethyl-2,2'-dichloro-4,4'-diaminodiphenylmethane (M-CDEA); 3,3'-diisopropyl-5,5'-dimethyl-4,4'-diaminodiphenylmethane (M-MIPA); 3,3',5,5'-tetraisopropyl-4,4'-diaminodiphenylmethane (M-DIPA); 4,4'-diamino diphenyl-sulfone (DDS); 4-amino-N-(4-aminophenyl)benzenesulfonamide; 5,5'-methylenedianthranilic acid; dimethyl-(5,5'-methylenedianthranilate); 1,3-propylene-bis(4-aminobenzoate); 1,4-butylene-bis(4-aminobenzoate); polytetramethylene oxide-bis(4-aminobenzoate) (available as Versalink® from Air Products); 1,2-bis(2-aminophenylthio)ethane, 2-methylpropyl-(4-chloro-3,5-diaminobenzoate); and, tert.butyl-(4-chloro-3,5-diaminobenzoate).

viii) Polyamidoamines of which indicative members include the reaction products of monohydric or polyhydric carboxylic acids or the esters or anhydrides thereof,—in particular dimer fatty acids—and an aliphatic, cycloaliphatic or aromatic polyamine, for instance polyalkyleneimines such as DETA or TETA. Commercially available polyamidoamines include: Versamid® 100, 125, 140 and 150 (from Cognis); Aradur® 223, 250 and 848 (from Huntsman); Euretek® 3607 and 530 (from Huntsman); and, Beckopox® EH 651, EH 654, EH 655, EH 661 and EH 663 (from Cytec).

Preferred among the aforementioned polyamines having at least two primary aliphatic amine groups are: isophorone diamine (IPDA); hexamethylene diamine (HMDA); 1,3-bis(amino-methyl)cyclohexane; 1,4-bis(aminomethyl)cyclohexane; bis(4-amino-cyclohexyl)methane; bis(4-amino-3-methylcyclohexyl)methane; NBDA; and, ether group-containing polyamines with a number average molecular weight (Mn) of up to 500 g/mol. Particularly preferred among said ether group-containing polyamines are Jeffamine® D-230 and D-600 (available from Huntsman).

As noted above, the composition of the present invention may optionally comprise at least one compound which has at least two reactive mercapto-groups per molecule. Suitable mercapto-group containing compounds, which may be used alone or in combination, include but are not limited to the following.

Liquid mercaptan-terminated polysulfide polymers of which commercial examples include: Thiokol® polymers (available from Morton Thiokol), in particular the types LP-3, LP-33, LP-980, LP-23, LP-55, LP-56, LP-12, LP-31, LP-32 and LP-2 thereof; and, Thioplast® polymers (from Akzo Nobel), in particular the types G10, G112, G131, G1, G12, G21, G22, G44 and G4.

Mercaptan-terminated polyoxyalkylene ethers, obtainable by reacting polyoxyalkylenedi- and -triols either with epichlorohydrin or with an alkylene oxide, followed by sodium hydrogen sulfide.

Mercaptan-terminated compounds in the form of polyoxyalkylene derivatives, known under the trade name of Capcure® (from Cognis), in particular the types WR-8, LOF and 3-800 thereof.

Polyesters of thiocarboxylic acids of which particular examples include: pentaerythritol tetramercapto-acetate (PETMP); trimethylolpropane trimercaptoacetate (TMPMP); glycol dimercaptoacetate; and, the esterification products of polyoxyalkylene diols and triols, ethoxylated trimethylolpropane and polyester diols with thiocarboxylic acids such as thioglycolic acid and 2- or 3-mercaptopropionic acid.

2,4,6-trimercapto-1,3,5-triazine, 2,2'-(ethylenedioxy)-diethanethiol (triethylene glycol dimercaptan) and/or ethanedithiol.

A preference for the use of polyesters of thiocarboxylic acids and, in particular, for the use of at least one of pentaerythritol tetramercapto-acetate (PETMP), trimethylolpropane trimercaptoacetate (TMPMP) and glycol dimercaptoacetate is acknowledged.

As noted above, the curative may comprise at least one Mannich base. Such compounds may be characterized by containing at least one phenalkamine and, in particular, a phenalkamine obtained from the condensation of cardanol (CAS Number: 37330-39-5), an aldehyde and an amine. The reactant amine in the condensation reaction is desirably ethylenediamine or diethyltriamine.

Mannich bases and phenalkamines are known in the art and suitable examples include the commercially available phenalkamines Cardolite® NC-541, NC-557, NC-558, NC-566, Lite 2001 and Lite 2002 (available from Cardolite), Aradur® 3440, 3441, 3442 and 3460 (available from Huntsman) and Beckopox® EH 614, EH 621, EH 624, EH 628 and EH 629 (available from Cytec).

Accelerator

Suitable accelerators are substances that promote the reaction between the epoxide groups and the epoxide-reactive groups, for instance the reaction between the amine or thiol groups and the epoxide groups. A specific example relates to the use of an amine accelerator which functions by de-protonation of reactive thiol (—SH) groups present to thiolate (—S"), which thiolate reacts with epoxy group by nucleophilic ring opening polymerization.

Without intention to the limit the accelerators used in the present invention, mention may be made of the following suitable accelerators: i) acids or compounds hydrolysable to acids, in particular a) organic carboxylic acids, such as acetic acid, benzoic acid, salicylic acid, 2-nitrobenzoic acid and lactic acid; b) organic sulfonic acids, such as methanesulfonic acid, p-toluenesulfonic acid and 4-dodecylbenzenesulfonic acid; c) sulfonic acid esters; d) inorganic acids, such as phosphoric acid; e) Lewis acid compounds, such as $BF_3$ amine complexes, $SbF_6$ sulfonium compounds, bis-arene iron complexes; f) Bronsted acid compounds, such as pentafluoroantimonic acid complexes; and, e) mixtures of the aforementioned acids and acid esters; ii) tertiary amines, such as 1,4-diazabicyclo[2.2.2]octane, benzyldimethylamine, α-methylbenzyl dimethylamine, triethanolamine, dimethylamino propylamine, imidazoles—including N-methylimidazole, N-vinylimidazole and 1,2-dimethylimidazole— and salts of such tertiary amines; iii) quaternary ammonium salts, such as benzyltrimethyl ammonium chloride; iv) amidines, such as 1,8-diazabicyclo[5.4.0]undec-7-ene; v) guanidines, such as 1,1,3,3-tetramethylguanidine; vi) phenols, in particular bisphenols; vii) phenol resins; and, viii) phosphites, such as di- and triphenylphosphites.

The skilled artisan will recognize that the selection of an accelerator is not simply concerned with adding the fastest accelerator. Other factors determinative in the selection of accelerators include: cost; toxicity; solubility; processing effects, such as working time, premature gelation, exothermic degradation, expansion and off-gassing; final properties, such as glass transition temperature ($T_g$), modulus, strength, elongation at break and chemical resistance; regulatory concerns; and, ease of use.

It is preferred in the present invention to employ an accelerator comprising or consisting of at least one tertiary amine, at least one amidine or mixtures thereof. More particularly, the accelerator should be selected from the group consisting of imidazole, methylimidazole, benzyldimethylamine, 1,8-diazabicyclo[5.4.0]undec-7-ene, 1,4-diazabicyclo(2,2,2)octane and mixtures thereof.

The accelerator should typically be present in the composition in an amount of from 0.1 to 15 wt. %, based on the weight of the second part: the accelerator may preferably constitute from 1 to 15 wt. %, for example from 5 to 15 wt. % of said second part.

These accelerator quantities are preferred because quantity greater than 15% may lead to an excess of accelerator in a composition, which may adversely affect cure process and adhesive properties, whereas low quantities, mainly below 0.1%, may lead no physical effect.

Additives and Adjunct Ingredients

Said compositions obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives—which independently of one another may be included in single parts or both parts of a two (2K) part composition—are: plasticizers; stabilizers including UV stabilizers; antioxidants; tougheners; reactive diluents; drying agents; adhesion promoters; fungicides; flame retardants; rheological adjuvants; color pigments or color pastes; and/or optionally also, to a small extent, non-reactive diluents.

Such adjuvants and additives can be used in such combination and proportions as desired, provided they do not adversely affect the nature and essential properties of the composition. While exceptions may exist in some cases, these adjuvants and additives should not in toto comprise more than 50 wt. % of the total composition and preferably should not comprise more than 20 wt. % of the composition.

For completeness, it is noted that, in general, adjunct materials and additives which contain reactive groups will be blended into the appropriate part of the two (2K) part composition to ensure the storage stability thereof. Unreactive materials may be formulated into either or both of the two parts.

A "plasticizer" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: diurethanes; ethers of monofunctional, linear or branched C4-C16 alcohols, such as Cetiol OE (obtainable from Cognis Deutschland GmbH, Dusseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential.

"Stabilizers" for purposes of this invention are to be understood as antioxidants, UV stabilizers, thermal stabilizers or hydrolysis stabilizers. Herein stabilizers may constitute in toto up to 10 wt. % or up to 5 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and, mixtures thereof.

Those compositions of the present invention may optionally contain a toughening rubber in the form of core-shell particles dispersed in the epoxy resin matrix. The term "core shell rubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The shell layer partially or entirely covers the surface of the rubber particle core in the graft polymerization process. By weight, the core should constitute at least 50 wt. % of the core-shell rubber particle.

The polymeric material of the core should have a glass transition temperature ($T_g$) of no greater than 0° C. and preferably a glass transition temperature ($T_g$) of −20° C. or lower, more preferably −40° C. or lower and even more preferably −60° C. or lower. The polymer of the shell is non-elastomeric, thermoplastic or thermoset polymer having a glass transition temperature ($T_g$) of greater than room temperature, preferably greater than 30° C. and more preferably greater than 50° C.

Without intention to limit the invention, the core may be comprised of: a diene homopolymer, for example, a homopolymer of butadiene or isoprene; a diene copolymer, for example a copolymer of butadiene or isoprene with one or more ethylenically unsaturated monomers, such as vinyl aromatic monomers, (meth)acrylonitrile or (meth)acrylates; polymers based on (meth)acrylic acid ester monomers, such as polybutylacrylate; and, polysiloxane elastomers such as polydimethylsiloxane and crosslinked polydimethylsiloxane.

Similarly, without intention to limit the present invention, the shell may be comprised of a polymer or copolymer of one or more monomers selected from: (meth)acrylates, such as methyl methacrylate; vinyl aromatic monomers, such as styrene; vinyl cyanides, such as acrylonitrile; unsaturated acids and anhydrides, such as acrylic acid; and, (meth) acrylamides. The polymer or copolymer used in the shell may possess acid groups that are cross-linked ionically through metal carboxylate formation, in particular through forming salts of divalent metal cations. The shell polymer or copolymer may also be covalently cross-linked by monomers having two or more double bonds per molecule.

It is preferred that any included core-shell rubber particles have an average particle size (d50) of from 10 nm to 300 nm, for example from 50 nm to 250 nm: said particle size refers to the diameter or largest dimension of a particle in a distribution of particles and is measured via dynamic light scattering. For completeness, the present application does not preclude the presence of two or more types of core shell rubber (CSR) particles with different particle size distributions in the composition to provide a balance of key properties of the resultant cured product, including shear strength, peel strength and resin fracture toughness.

The core-shell rubber may be selected from commercially available products, examples of which include: Paraloid EXL 2650A, EXL 2655 and EXL2691 A, available from The Dow Chemical Company; Clearstrength® XT100, available from Arkema Inc.; the Kane Ace® MX series available from Kaneka Corporation, and in particular MX 120, MX 125, MX 130, MX 136, MX 551, MX553; and, METABLEN SX-006 available from Mitsubishi Rayon.

The core shell rubber particles should be included in the composition in an amount of from 0 to 15 wt. %, for example in an amount of from 1 to 10 wt. %, based on the total weight of the composition.

In an alternative expression of preference, which is not intended to be mutually exclusive of that mentioned above, the core shell rubber particles should constitute from 1 to 30 wt. %, preferably from 5 to 25 wt. %, for example from 5 to 20 wt. % of the first part of the composition.

The presence of solvents and non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol; benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said non-reactive diluents constitute in toto less than 10 wt. %, in particular less than 5 wt. % or less than 2 wt. %, based on the total weight of the composition.

Illustrative Embodiment of the Two-Part (2K) Composition

In an exemplary embodiment of the present invention, the two-part (2K) adhesive composition comprises:
a first part comprising, based on the weight of said first part:
from 20 to 45 wt. %, preferably from 25 to 40 wt. %, of epoxy resin selected from the group consisting of bis-phenol A epoxy resin, bis-phenol F epoxy resin, mixture of bis-phenol A epoxy resin and bis-phenol F epoxy resin, cycloaliphatic epoxy resin and mixtures thereof;
from 10 to 30 wt. % of (meth)acrylate monomer, wherein said (meth)acrylate monomer is selected from group consisting of $C_1$-$C_6$ alkyl esters of (meth)acrylic acid, $C_3$-$C_{12}$ cycloalkyl esters of (meth)acrylic acid, ethoxylatedtrimethylolpropanetriacrylate, trimethylolpropane triacrylate and mixtures thereof;
from 5 to 20 wt. % of electrolyte, wherein said electrolyte is selected from 1-ethyl-3-methylimidazolium methansulfonate, 1-ethyl-3-methylimidazolium methyl sulfate and mixtures thereof; and, from 1 to 15 wt. of solubilizer, wherein said solubilizer comprises a polyoxy($C_2$-$C_3$)alkylene glycol having a weight average molecular weight of from 200 to 10000 g/mol, for example 200 to 2000 g/mol; and, filler; and,
a second part comprising:
a curing agent consisting of at least one compound possessing at least two epoxide reactive groups per molecule, wherein said curing agent comprises at least one polyamine having at least two amine hydrogens reactive toward epoxide groups, said polyamine being further characterized by containing primary and/or secondary amine groups and having an equivalent weight per primary or secondary amine group of not more than 150 g/eq;
from 5 to 15 wt. %, based on the weight of said second part, of accelerator, wherein said accelerator is selected from the group consisting of tertiary amines, quaternary ammonium salts, amidines, guanidines and mixtures thereof; and,
filler.

The Applicant has found out that the combination of epoxy resin and acrylate resin in a two-part curable composition according to the present invention will provide improved performance and reduced shrinkage especially on plastic surfaces. This is achieved by selecting epoxy resin to provide good chemical resistance, good temperature range, ideal Tg value, good adhesion to metal surfaces and low to close to no shrinkage and acrylate resin to provide high T-peel values, good adhesion to plastic surfaces and fast cure.

Methods and Applications

To form the defined two part (2K) curable compositions, the reactive parts are brought together and mixed in such a manner as to induce the hardening thereof. The reactive compounds should be mixed under sufficient shear forces to yield a homogeneous mixture. It is considered that this can be achieved without special conditions or special equipment. That said, suitable mixing devices might include: static mixing devices; magnetic stir bar apparatuses; wire whisk devices; augers; batch mixers; planetary mixers; C. W. Brabender or Banburry® style mixers; and, high shear mixers, such as blade-style blenders and rotary impellers.

For small-scale applications in which volumes of less than 2 litres will generally be used, the preferred packaging for the two part (2K) compositions will be side-by-side double cartridges or coaxial cartridges, in which two tubular chambers—typically of equal volume—are arranged alongside one another or inside one another and are sealed with pistons: the driving of these pistons allows the parts to be extruded from the cartridge, advantageously through a closely mounted static, speed or dynamic mixer. For larger volume applications, the two parts of the composition may advantageously be stored in drums or pails: in this case the two parts are extruded via hydraulic presses, in particular by way of follower plates, and are supplied via pipelines to a mixing apparatus which can ensure fine and highly homogeneous mixing of the two parts. In any event, for any package it is important that the parts be disposed with an airtight and moisture-tight seal, so that both parts can be stored for a long time, ideally for 12 months or longer.

Non-limiting examples of two part dispensing apparatuses and methods that may be suitable for the present invention include those described in U.S. Pat. Nos. 6,129,244 and 8,313,006.

The first and second parts of the composition will conventionally be mixed in amounts by weight which achieve the desired ratio of epoxide groups to epoxide-reactive groups. By way of example, the ratio by weight of said first part to said second part may be in the range from 12:1 to 2:1, preferably from 10:1 to 2:1, for example from 8:1 to 3:1 or 7:1 to 5:1.

Where applicable, the two (2K) part curable compositions should broadly be formulated to exhibit an initial viscosity—determined immediately after mixing, for example, up to two minutes after mixing—of less than 200000 mPa·s, for instance less than 100000 mPa·s, at 25° C. Independently of or additional to said viscosity characteristics, the two (2K) part composition should be formulated to be bubble (foam) free upon mixing and subsequent curing.

In accordance with the broadest process aspects of the present invention, the above described compositions are applied to the material layer(s) and then cured in situ. Prior to applying the compositions, it is often advisable to pre-treat the relevant surfaces to remove foreign matter therefrom: this step can, if applicable, facilitate the subsequent adhesion of the compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

In some embodiments, the adhesion of the compositions of the present invention to the preferably pre-treated substrate may be facilitated by the application of a primer thereto. Indeed, primer compositions may be necessary to ensure efficacious fixture and/or cure times of the adhesive compositions on inactive substrates. Whilst the skilled artisan will be able to select an appropriate primer, instructive references for the choice of primer include but are not limited to: U.S. Pat. Nos. 3,855,040; 4,731,146; 4,990,281; 5,811,473; GB 2502554; and, U.S. Pat. No. 6,852,193.

The compositions are then applied to the preferably pre-treated substrate by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray.

As noted above, the present invention provides a bonded structure comprising: a first material layer having an electrically conductive surface; and, a second material layer having an electrically conductive surface, wherein the cured debondable two-part (2K) adhesive composition as defined hereinabove and in the appended claims is disposed between said first and second material layers. To produce such a structure, the adhesive composition may be applied to at least one internal surface of the first and/or second material layer and the two layers then subsequently contacted, optionally under the application of pressure, such that the electrically debondable hot melt adhesive composition is interposed between the two layers.

It is recommended that the compositions be applied to a surface at a wet film thickness of from 10 to 500 μm. The application of thinner layers within this range is more economical and provides for a reduced likelihood of deleterious thick cured regions. However, great control must be exercised in applying thinner coatings or layers so as to avoid the formation of discontinuous cured films.

The curing of the applied compositions of the invention typically occurs at temperatures in the range of from 40° C. to 200° C., preferably from 50° C. to 175° C., and in particular from 75° C. to 175° C. The temperature that is suitable depends on the specific compounds present and the desired curing rate and can be determined in the individual case by the skilled artisan, using simple preliminary tests if necessary. Of course, curing at lower temperatures within the aforementioned ranges is advantageous as it obviates the requirement to substantially heat or cool the mixture from the usually prevailing ambient temperature. Where applicable, however, the temperature of the mixture formed from the respective parts of a two (2K) part composition may be raised above the mixing temperature and/or the application temperature using conventional means including microwave induction.

The present invention will be described with reference to the appended drawings in which.

Figure 1A:
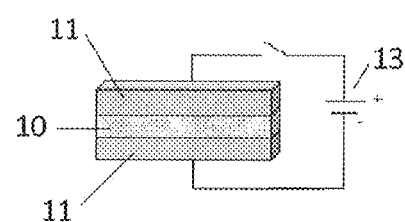
FIG. 1a illustrates a bonded structure in accordance with a first embodiment of the present invention.
Figure 1B:
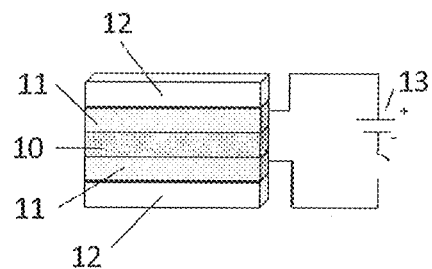
FIG. 1b illustrates a bonded structure in accordance with a second embodiment of the present invention.

As shown in FIG. 1a appended hereto, a bonded structure is provided in which a layer of cured adhesive (10) is disposed between two conductive substrates (11). A layer of non-conductive material (12) may be disposed on the conductive substrates (11) to form the more complex bonded structure as depicted in FIG. 1b. Each layer of conductive substrate (11) is in electrical contact with an electrical power source (13) which may be a battery or an AC-driven source of direct current (DC). The positive and negative terminals of that power source (13) are shown in one fixed position but the skilled artisan will of course recognize that the polarity of the system can be reversed.

The two conductive substrates (11) are shown in the form of a layer which may be constituted by inter alia: a metallic film; a metallic sheet; a metallic mesh or grid; deposited metal particles; a resinous material which is rendered conductive by virtue of conductive elements disposed therein; or, a conducting oxide layer. As exemplary conductive elements there may be mentioned silver filaments, single-walled carbon nanotubes and multi-walled carbon nanotubes. As exemplary conducting oxides there may be mentioned: doped indium oxides, such as indium tin oxide (ITO); doped zinc oxide; antimony tin oxide; cadmium stannate; and, zinc stannate. The selection of the conductive material aside, the skilled artisan will recognize that the efficacy of the debonding operation may be diminished where the conductive substrates (11) are in the form of a grid or mesh which offers limited contact with the layer of cured adhesive (10).

When an electrical voltage is applied between each conductive substrate (11), current is supplied to the adhesive composition (10) disposed there between. This induces electrochemical reactions at the interface of the substrates (11) and the adhesive composition, which electrochemical reactions are understood as oxidative at the positively charged or anodic interface and reductive at the negatively charged or cathodic interface. The reactions are considered to weaken the adhesive bond between the substrates allowing the easy removal of the debondable composition from the substrate.

Figure 2A:
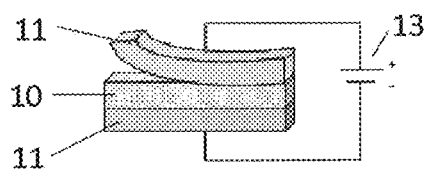
FIG. 2a illustrates the initial debonding of the structure of the first embodiment upon passage of a current across that structure.
Figure 2B:
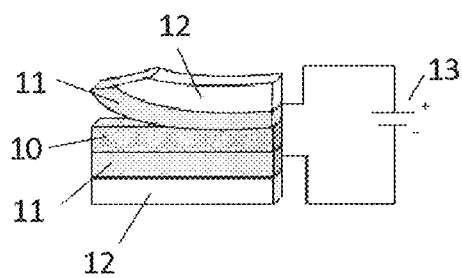
FIG. 2b illustrates the initial debonding of the structure of the second embodiment upon passage of a current across that structure.

As depicted in FIGS. 2a and 2b, the debonding occurs at the positive interface, that interface between the adhesive composition (10) and the electrically conductive surface (11) that is in electrical contact with the positive electrode. By reversing current direction prior to separation of the substrates, the adhesive bond may be weakened at both substrate interfaces.

It is however noted that the composition of the adhesive layer (10) may be moderated so that debonding occurs at either the positive or negative interface or simultaneously from both. For some embodiments a voltage applied across both surfaces so as to form an anodic interface and a cathodic interface will cause debonding to occur simultaneously at both the anodic and cathodic adhesive/substrate interfaces. In an alternative embodiment, reversed polarity may be used to simultaneously disbond both substrate/adhesive interfaces if the composition does not respond at both interfaces to direct current. The current can be applied with any suitable waveform, provided that sufficient total time at each polarity is allowed for debonding to occur. Sinusoidal, rectangular and triangular waveforms might be appropriate in this regard and may be applied from a controlled voltage or a controlled current source.

Without intention to limit the present invention, it is considered that the debonding operation may be performed effectively where at least one and preferably both of the following conditions are instigated: a) an applied voltage of from 0.5 to 200 V; and, b) the voltage being applied for a duration of from 1 second to 120 minutes, for example from 1 second to 60 or 30 minutes. Where the release of the conductive substrate from the cured adhesive is to be facilitated by the application of a force—exerted via a weight or a spring, for instance—the potential might only need to be applied for the order of seconds.

The following examples are illustrative of the present invention and are not intended to limit the scope of the invention in any way.

EXAMPLES

The following materials were employed in the Examples:

| | |
|---|---|
| Cab-O-Sil 720: | Fumed silica which has been surface treated with polydimethylsiloxane (PDMS) available from Cabot Corporation. |
| Casiflux G20: | Particulate wollastonite, available from Sibelco. |
| Barbituric Acid | Pyrimidine-2,4,6(1H,3H,5H)-trione, available from Merck. |
| 1-Ethyl-3-methylimidazolium methansulfonate: | Available from TCI America Inc. |
| Kane Ace ® MX-153 | Core-shell rubber particles dispersed in bisphenol-A epoxy resin series, available from Kaneka Corporation. |
| DER 337: | Intermediate epoxy equivalent weight semi-solid resin based on Bisphenol-A epoxy, available from Olin. |
| DER 331: | Liquid Epoxy Resin, reaction product of epichlorohydrin and bisphenol A, available from Olin. |
| Erisys GE-30: | Low viscosity high epoxy functional resin (EEW, 135-150 g/eq), available from CVC Thermosets. |
| EOTMPTA Ac 50 | Ethoxylated trimethylolpropane triacrylate containing silica available from Nissan Chemical Industries. |
| Jeffamine ® D-2000: | Ether group-containing aliphatic primary polyamine, available from Huntsman. |
| Jeffamine ® EDR-176: | Ether group-containing aliphatic primary polyamine, available from Huntsman. |
| Shieldex AC 3 | Anti-corrosion pigment, available from Grace Davison. |
| PEG400: | Polyethylene glycol, available from Sigma Aldrich. |
| Albiflex 296: | Bisphenol-A-epoxy-silicone block copolymer resin, available from Evonik Industries. |
| Tris [2-(acryloyloxy)ethyl]isocyanurate: | Acrylate monomer, available from Sigma Aldrich |
| Tegopren 5843: | Polyether siloxanes/100% active silicone surfactant, available from Evonik |
| 4,7,10-Trioxa-1,13-tridecandiamin: | Curing agent, available from Sigma Aldrich |
| Tetraethylenpentamin: | Curing agent, available from Acros |
| Capcure 3-800: | A liquid curing agent, available from Cognis |
| N,N,N',N',-Tetramethylenethylendiamin: | Curing agent, available from Merck |

-continued

| | |
|---|---|
| PEGGE (Mn = 380): | Solubilizer, poly(propylene glycol) diglycidyl ether with average Mn≈380, available from Sigma Aldrich |

Examples 1, 2 and 3

Parts (A) of three two-part (2K) compositions were prepared in accordance with Table 1 hereinbelow:

TABLE 1

| Part A Ingredient | Example 1 (wt. % of Part A) | Example 2 (wt. % of Part A) | Example 3 (wt. % of Part A) |
|---|---|---|---|
| D.E.R. 337 | 33.96 | 36.89 | |
| D.E.R 331 | | | 30.02 |
| Kane Ace MX-153 | 7.55% | | 18.77 |
| EOTMPTA-AC-50 | 22.64 | 24.59 | |
| Methylmethacrylate | | | 18.77 |
| PEG400 | 1.51 | 1.64 | |
| Albiflex 296 | | | 11.25 |
| Methacrylsäure | 3.77 | 4.10 | |
| Barbitursäure | 0.38 | | |
| Erisys GE-30 | | | 2.25 |
| Casiflux G20 | 7.55 | 8.20 | |
| Shieldex AC 3 | 0.75 | 0.82 | |
| Cab-o-Sil TS 720 | 6.79 | 7.38 | 2.25 |
| 1-Ethyl-3-methylimidazoliummethansulfonat | 15.09 | 16.39 | 16.68 |

Part (B) was identically prepared for each of the three two-part (2K) compositions and in accordance with Table 2 hereinbelow:

TABLE 2

| Part B Ingredient | Examples 1-3 (wt. % of Part B) |
|---|---|
| Jeffamine EDR-176 (XTJ-590) | 45.00 |
| Jeffamine D2000 | 27.00 |
| Accelerator 2950 CH | 10.00 |
| Cab-o-Sil TS 720 | 18.00 |

For each Example, parts (A, B) were loaded into separate compartments of a 50 g cartridge and sealed at both ends. The cartridge was then loaded into a cartridge-gun and a mixing tip was installed on the front end. By application of constant pressure on the trigger, the two parts were pushed into the mixing tip to ensure sufficient mixing before application to the stated substrate. The weight ratios of Part A to Part B for the Examples were: 6.5:1 (Example 1); 7.5:1 (Example 2); and 4.5:1 (Example 3).

The substrates were aluminium (AA6016, thickness 1.25 mm) and stainless steel (1.4301, thickness 1.5 mm) each with a thickness of substrates were cut into 2.5 cm×10 cm (1"×4") in size for tensile testing.

Tensile lap shear (TLS) test was performed according to test method described on page 5.

The applied two-part (2K) adhesive compositions were cured in the overlapping region by the application of a temperature of 150° C. for 30 minutes. Subsequently, the samples were stored at 25° C. with 20% humidity in a climate chamber. The bonded structures were further stored for the specific numbers of days given in Table 3 below.

For the stated substrate, tensile lap shear strength was investigated after said storage period for both the untreated bonded substrate and bonded substrates which had been treated by the application of a constant potential of 50V across the adhesive layer for a duration of 20 minutes. The results are documented in Table 3 herein below.

TABLE 3

| | Example 1 Aluminium Substrate | | Example 2 Aluminium Substrate | | Example 2 Steel Substrate | | Example 3 Aluminium Substrate | |
|---|---|---|---|---|---|---|---|---|
| Storage (Days) | Strength (MPa) | Strength after 50 V, 20 min (MPa) | Strength (MPa) | Strength after 50 V, 20 min (MPa) | Strength (MPa) | Strength after 50 V, 20 min (MPa) | Strength (MPa) | Strength after 50 V, 20 min (MPa) |
| 1 | 14.56 | 6.59 | 9.29 | 4.53 | 9.35 | 3.65 | 7.70 | 2.45 |
| 7 | 12.14 | 2.54 | 9.16 | 2.09 | 8.23 | 1.20 | | |
| 14 | 12.92 | 2.30 | 8.62 | 1.35 | 7.56 | 0.87 | 8.04 | 2.98 |
| 21 | 12.43 | 1.80 | 8.77 | 1.76 | 7.21 | 0.40 | | |
| 30 | | | | | | | 7.93 | 2.86 |
| 60 | | | | | | | 8.17 | 3.13 |
| 90 | | | | | | | 7.85 | 3.37 |

Figure 4:
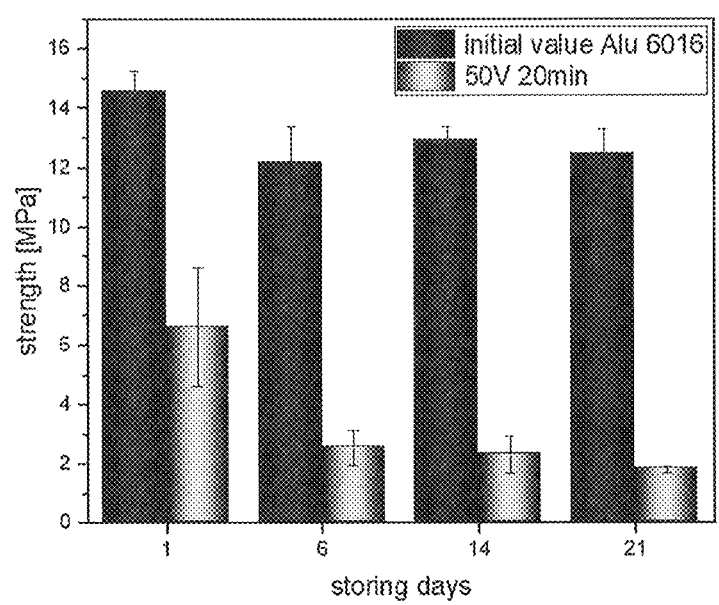
FIG. 4 illustrates stability of the composition according to the present invention over time.

FIG. 4 illustrate the results of lap shear strength testing of aluminium substrates bonded with a cured adhesive of example 1.

Examples 4, 5, 6 and 7

Parts (A) of four two-part (2K) compositions were prepared in accordance with Table 4 hereinbelow:

TABLE 4

| Part A Ingredient | Example 4 (wt. % of Part A) | Example 5 (wt. % of Part A) | Example 6 (wt. % of Part A) | Example 7 (wt. % of Part A) |
|---|---|---|---|---|
| D.E.R. 337 | 36.89 | 36.89 | 36.89 | 36.89 |
| EOTMPTA-AC-50 (acrylate) | 24.59 | 24.59 | 24.59 | 24.59 |
| PEG400 | 1.64 | 1.64 | 1.64 | 1.64 |
| Methacrylacid | 4.10 | 4.10 | 4.10 | 4.10 |
| Casiflux G20 | 8.20 | 8.20 | 8.20 | 8.20 |

TABLE 4-continued

| Part A Ingredient | Example 4 (wt. % of Part A) | Example 5 (wt. % of Part A) | Example 6 (wt. % of Part A) | Example 7 (wt. % of Part A) |
|---|---|---|---|---|
| Shieldex AC 3 | 0.82 | 0.82 | 0.82 | 0.82 |
| Cab-o-Sil TS 720 | 7.38 | 7.38 | 7.38 | 7.38 |
| 1-Ethyl-3-methylimidazoliummethansulfonate | 16.39 | | | |
| 1-Ethyl-3-methylimidazoliumtrifluoromethansulfonat | | 16.39 | | |
| Basionics ST 80 | | | 16.39 | |
| 1-Butyl-1-methyl-pyrrolidinium Trifluoromethanesulfonate | | | | 16.39 |

Part (B) was identically prepared for each of the four two-part (2K) compositions and in accordance with Table 5 herein below:

TABLE 5

| Part B Ingredient | Examples 1-3 (wt. % of Part B) |
|---|---|
| Jeffamine EDR-176 (XTJ-590) | 45.00 |
| Jeffamine D2000 | 27.00 |
| Accelerator 2950 CH | 10.00 |
| Cab-o-Sil TS 720 | 18.00 |

Example compositions and samples were prepared as described above for the examples 1-3, and same test method were used for testing. The results are documented in Table 6 herein below.

TABLE 6

| Aluminium | Initial value (MPa) | Constant potential 75 V | | Constant time 20 min | |
|---|---|---|---|---|---|
| Example 5 | 9.75 +/− 0.752 | 1 min | 3.30+/− 0.808 | 1 V | 8.72+/− 1.023 |
| | | 5 min | 2.23+/− 0.264 | 2 V | 9.18+/− 1.055 |
| | | 10 min | 2.13+/− 0.562 | 3 V | 7.57+/− 3.299 |
| | | 20 min | 2.17+/− 0.295 | 5 V | 7.16+/− 0.439 |
| | | 30 min | 1.71+/− 0.210 | 10 V | 7.51+/− 2.791 |
| | | 60 min | 1.31+/− 0.888 | 20 V | 5.86+/− 2.807 |
| | | | | 50 V | 6.80+/− 2.602 |
| | | | | 75 V | 4.27+/− 2.670 |
| Example 6 | 7.53 +/− 1.236 | 1 min | 4.26+/− 0.784 | 1 V | 8.58+/− 0.314 |
| | | 5 min | 2.65+/− 0.92 | 2 V | 9.18+/− 1.164 |
| | | 10 min | 1.96+/− 1.133 | 3 V | 8.80+/− 0.541 |
| | | 20 min | 1.37+/− 0.119 | 5 V | 8.80+/− 0.466 |
| | | 30 min | 0.65+/− 0.302 | 10 V | 8.77+/− 1.256 |
| | | 60 min | 1.00+/− 0.046 | 20 V | 8.73+/− 1.486 |
| | | | | 50 V | 5.11+/− 1.454 |
| | | | | 75 V | 4.92+/− 1.619 |
| Example 7 | 8.66 +/− 0.966 | | | 1 V | 9.79+/− 0.372 |
| | | | | 2 V | 8.98+/− 0.568 |
| | | | | 3 V | 9.82+/− 0.696 |
| | | | | 5 V | 8.14+/− 1.012 |
| | | | | 10 V | 7.37+/− 0.210 |
| | | | | 20 V | 3.65+/− 0.331 |
| | | | | 50 V | 2.93+/− 0.085 |
| | | | | 75 V | 2.52+/− 0.516 |

Figure 3A:
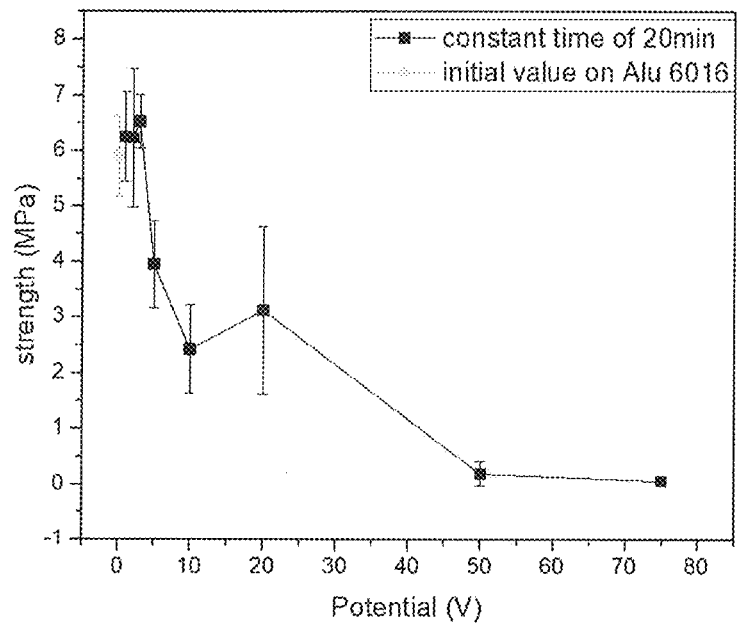
FIG. 3a illustrates the debonding with different potentials applied for 20 min.
Figure 3B:
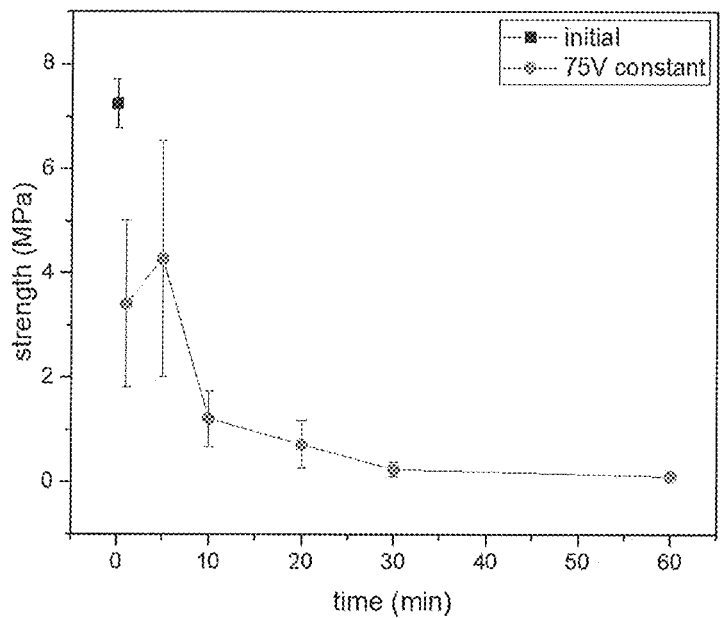
FIG. 3b illustrates the debonding with 75 V over time.

FIG. 3a illustrates the debonding with different potentials applied for 20 min, and FIG. 3b illustrates the debonding with 75 V over time.

Example 8

Parts (A) of four two-part (2K) composition were prepared in accordance with Table 7 hereinbelow:

TABLE 7

| Part A Ingredient | Example 8 (wt. % of Part A) |
|---|---|
| D.E.R. 337 | 24.39% |
| Tris [2-(acryloyloxy)ethyl]isocyanurate | 19.51% |
| Tegopren 5843 | 31.22% |
| 1-Ethyl-3-methylimidazoliummethansulfonat | 9.03% |
| PEGGE (Mn = 380) | 15.85% |

| Part B Ingredient | (wt. % of Part B) |
|---|---|
| Tris [2-(acryloyloxy)ethyl]isocyanurate | 23.80% |
| 4,7,10-Trioxa-1,13-tridecandiamin | 57.11% |
| Tetraethylenpentamin | 14.29% |
| Capcure 3-800 | 2.40% |
| N,N,N,N,-Tetramethylenethylendiamine | 2.40% |

Example compositions and samples were prepared as described above for the examples 1-3, and same test method were used for testing. The results are documented in Table 8 herein below.

TABLE 8

| Substrate | Initial Bond Strength (MPa) | Bond Strength after 50 V, 20 minutes (MPa) |
|---|---|---|
| Aluminium | 2.32 (±0.494) | 0.04 (±0.022) |

In view of the foregoing description and examples, it will be apparent to those skilled in the art that equivalent modifications thereof can be made without departing from the scope of the claims.

What is claimed is:
1. A curable and debondable two-part hybrid adhesive composition comprising:
 a first part comprising:
  a) epoxy resin;
  b) (meth)acrylate monomer;
  c) an electrolyte;
  d) a solubilizer; and e) a filler in an amount of from 1 to 40% by weight of the total weight of the first part;
f) a co-polymerizable acid; and
a second part comprising:
a) a compound possessing at least two epoxide reactive groups per molecule;
b) an accelerator; and
c) filler in an amount of from 10 to 30% by weight of the total weight of the second part, wherein said filler in the first part and said filler in the second part can be same or different and are independently selected from the group consisting of calcium carbonate, calcium oxide, talcum, fumed silica, wollastonite, barium sulphate and mixtures thereof, and whose presence in either or both of the first part and the second part adjusts the viscosity thereof.

2. A curable and debondable two-part hybrid adhesive composition according to claim 1, wherein said epoxy resin is selected from the group consisting of bis-phenol A epoxy resin, bis-phenol F epoxy resin, mixture of bis-phenol A epoxy resin and bis-phenol F epoxy resin, cycloaliphatic epoxy resin and mixtures thereof.

3. A curable and debondable two-part hybrid adhesive composition according to claim 1, wherein said epoxy resin is present in an amount of from 15 to 60% by weight of the total weight of the first part.

4. A curable and debondable two-part hybrid adhesive composition according to claim 1, wherein said (meth)acrylate monomer is selected from the group consisting of methyl (meth)acrylate, ethyl (meth)acrylate, n-propyl (meth)acrylate, isopropyl (meth)acrylate, n-butyl(meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl(meth)acrylate, 2-ethylhexyl-(meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, isobornyl (meth)acrylate, 2-aminoethyl (meth)acrylate, y-(meth)acryloyloxypropyl trimethoxysilane, (meth)acrylic acid-ethylene oxide adduct, trifluoromethylmethyl (meth)acrylate, 2-trifluoromethylethyl (meth)acrylate, 2-perfluoro ethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri propylene glycol di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate, and mixtures thereof.

5. A curable and debondable two-part hybrid adhesive composition according to claim 1, wherein said (meth)acrylate monomer is present in an amount of from 5 to 50% by weight of the total weight of the first part.

6. A curable and debondable two-part hybrid adhesive composition according to claim 1, wherein said electrolyte is selected from the group consisting of 11-ethyl-3-methylimidazolium methansulfonate, 1-ethyl-3-methylimidazolium methyl sulfate, 1-hexyl-3-methylimidazolium 2-(2-fluoroanilino)-pyridinate, 1-hexyl-3-methylimidazolium imide, 1-butyl-1-methyl-pyrrolidinium 2-(2-fluoroanilino)-pyridinate, 1-butyl-1-methyl-pyrrolidinium imide, trihexyl (tetradecyl) phospholium 2-(2-fluoroanilino)-pyridinate, cyclohexyltrimethylammonium bis (trifluormethylsulfonyl) imide, di(2-hydroxyethyl) ammonium trifluoroaetate, N,N-dimethyl (2-hydroxyethyl) ammonium octanoate, methyltrioctylammonium bis(trifluoromethylsulfonyl) imide, N-ethyl-N—N—N—N-tetramethylguanidinium trifluoromethanesulfonate, guanidinium trifluoromethanesulfonate, 1-butyl-4-methylpyridinium bromide, 1-buthyl-3-methylpyridinium tetrafluoroborate, 1-butyl-3-hydroxymethylpyridinium ethylsulfate, 1-butyl-1-methylpyrrolidinium bis(trifluoromethylsulfonyl) imide, 1-butyl-methylpyrrolidinium tris (pentafluoroethyl) trifluorophosphate, 3-methyl imidazolium ethylsulfate, 1-ethyl-3-methylimidazolium chloride, 1-ethyl-3-ethyl-methylimidazolium bromide, 1-butyl-3-methylimidazolium chloride, 1-hexyl-3-methylimidazolium chloride, 1-octyl-3-methylimidazolium chloride, 1-methyl-3-octylimidazolium chloride, 1-propyl-3-methylimidazolium iodide, 1-butyl-3-methylimidazolium tetrafluoroborate, 1-butyl-3-methylimidazolium trifluoromethanesulfonate, 1-butyl-3-methylimidazolium hexafluorophosphate, 1-butyl-2,3-dimethylimidazolium tetrafluoroborate, 1-butyl-2,3-dimethylimidazolium hexafluorophosphate, 1-butylimidazol, 1-methylimidazolium tetrafluoroborate, tetrabutylphosphonium tris (pentafluoroethyl) trifluorophosphate, trihexyl (tetradecyl) phosphonium tetrafluoroborate and mixtures thereof.

7. A curable and debondable two-part hybrid adhesive composition according to claim 1, wherein said electrolyte is present in an amount of from 2.5 to 25% by weight of the total weight of the composition.

8. A curable and debondable two-part hybrid adhesive composition according to claim 1, wherein said solubilizer is selected from: polyphosphazenes; polymethylenesulfides; polyoxyalkylene glycols; polyethylene imines; silicone surfactants and fluorinated silicone surfactants; co-polymers of functionalized polyalkysiloxanes and epoxy resins; polyhydric alcohols; and, sugars.

9. A curable and debondable two-part hybrid adhesive composition according to claim 1, wherein said solubilizer is present in an amount of from 0.5 to 20% by weight of the total weight of the first part.

10. A curable and debondable two-part hybrid adhesive composition according to claim 1, wherein said first part further comprises a toughener.

11. A curable and debondable two-part hybrid adhesive composition according to claim 1, wherein said curing agent comprises at least one polyamine having at least two amine hydrogens reactive toward epoxide groups, said polyamine being further characterized by containing primary and/or secondary amine groups and having an equivalent weight per primary or secondary amine group of not more than 150 g/eq.

12. A curable and debondable two-part hybrid adhesive composition according to claim 1, wherein said accelerator is selected from the group consisting of tertiary amines, quaternary ammonium salts, amidines, guanidines and mixtures thereof.

13. A curable and debondable two-part hybrid adhesive composition according to claim 1, wherein said accelerator is present in an amount of from 0.1 to 15% by weight of the total weight of the second part.

14. A bonded structure comprising
   a first material layer having an electrically conductive surface;
   a second material layer having an electrically conductive surface;
   wherein a cured debondable two-part hybrid adhesive composition as defined in claim 1 is disposed between the first and second material layers.

15. A method of debonding said bonded structure according to claim 14, the method comprising the steps of:
   a. applying a voltage across both surfaces to form an anodic interface and a cathodic interface; and
   b. debonding the surfaces.

\* \* \* \* \*